(12) United States Patent
Hao et al.

(10) Patent No.: US 10,680,825 B2
(45) Date of Patent: Jun. 9, 2020

(54) AUTHENTICATION OF PHYSICAL OBJECT USING INTERNAL STRUCTURE

(71) Applicant: University of Newcastle Upon Tyne, Tyne and Wear (GB)

(72) Inventors: Feng Hao, Tyne and Wear (GB); Ehsan Toreini, Tyne and Wear (GB); Siamak F. Shahandashti, Tyne and Wear (GB)

(73) Assignee: UNIVERSITY OF NEWCASTLE UPON TYNE, Tyne and Wear (GB)

( * ) Notice: Subject to any disclaimer, the term of this patent is extended or adjusted under 35 U.S.C. 154(b) by 197 days.

(21) Appl. No.: 15/972,922

(22) Filed: May 7, 2018

(65) Prior Publication Data

US 2019/0342102 A1 Nov. 7, 2019

(30) Foreign Application Priority Data

May 6, 2018 (GB) .................................. 1807439.3

(51) Int. Cl.
*H04L 29/06* (2006.01)
*H04L 9/32* (2006.01)
(Continued)

(52) U.S. Cl.
CPC ........ *H04L 9/3242* (2013.01); *G06K 9/00577* (2013.01); *G09C 5/00* (2013.01); *H04L 9/0869* (2013.01); *H04L 9/3247* (2013.01)

(58) Field of Classification Search
CPC ... H04L 9/3242; H04L 9/0869; H04L 9/3247; G06K 9/00577; G09C 5/00
See application file for complete search history.

(56) References Cited

U.S. PATENT DOCUMENTS 8,505,108 B2 * 8/2013 Rhoads .............. G06K 9/00577
713/176
9,123,067 B2 * 9/2015 Deyle ................ G06Q 10/0833
(Continued)

*Primary Examiner* — Amir Mehrmanesh
(74) *Attorney, Agent, or Firm* — Dickinson Wright PLLC

(57) ABSTRACT

A method for preventing counterfeiting of an object (e.g. paper) is described. The method comprises capturing an image of at least a portion of the object, wherein the portion of the object whose image is captured is at least partially transparent, and wherein the captured image includes features of the internal structure of the object (e.g. the texture of the paper resulting from the arrangement of fibres from which the paper is made). The method further comprises generating, based on the image, a code that encodes features of the internal structure of the object, and recording the code. Generating the code may comprise applying a filter to the image to obtain a filtered image, and processing the filtered image to obtain a binary code. The filter may be a Gabor filter, and processing the filtered image may comprise applying a Gray code to the filtered image. The method may further comprise encrypting the binary code, and recording the code may comprise recording the encrypted binary code. A method for authenticating an object is also described. The method comprises capturing an image of at least a portion of the object, wherein the portion of the object whose image is captured is at least partially transparent, and wherein the captured image includes features of the internal structure of the object. The method further comprises generating, based on the image, a code that encodes features of the internal structure of the object, reading one or more reference values comprising at least a reference code, and authenticating the object based on the code and the reference code.

16 Claims, 15 Drawing Sheets

(a) Paper Surface (b) Paper Texture

(51) Int. Cl.
*G06K 9/00* (2006.01)
*G09C 5/00* (2006.01)
*H04L 9/08* (2006.01)

(56) References Cited

U.S. PATENT DOCUMENTS

| | | | |
|---|---|---|---|
| 9,940,729 B1* | 4/2018 | Kwant | G06T 7/73 |
| 2014/0224879 A1* | 8/2014 | Guigan | G06K 7/1456 |
| | | | 235/462.06 |
| 2018/0359272 A1* | 12/2018 | Mizrachi | H04L 63/1425 |

* cited by examiner (a) Camera and macro flash ring (b) Overhead projector as light source (c) Light box (tracing pad) as light source (a) Transmission (b) Reflection (a) Decidability for all orientations and scales. (b) Degrees of freedom for all orientations and scales.

AUTHENTICATION OF PHYSICAL OBJECT USING INTERNAL STRUCTURE

CROSS-REFERENCE TO RELATED APPLICATIONS

The present application is related to, and claims the benefit of priority from, United Kingdom Patent Application 1807439.3, filed May 6, 2018, the disclosure of which is incorporated herein by reference in its entirety.

FIELD OF THE DISCLOSURE

Certain examples of the present disclosure provide a technique for authenticating a physical object and/or for preventing cloning or counterfeiting of a physical object. For example, the present disclosure provides a technique for authenticating a physical object using the internal structure of the object. Certain examples provide a technique for authenticating a piece of paper (e.g. a banknote) using the inherent texture of the paper.

BACKGROUND

Designing secure documents (e.g. paper documents) that provide high levels of security against physical forgery is a long-standing problem. Even in today's digital age, this problem remains important as physical paper is still prevalently used in our daily lives as a means to prove data authenticity, for example, in receipts, contracts, certificates, and passports. A recent trend in this area (e.g., in e-passports) is to embed electronics such as RFID chips within the physical document in question. However, the security of such solutions depends on the tamper-resistance of the chip which must securely store a long-term secret. This tamper-resistance requirement can significantly increase the cost of production. In view of the importance of ensuring the authenticity of paper documents, researchers have been exploring applying digital technologies to prevent counterfeiting.

The above information is presented as background information only to assist with an understanding of the present disclosure. No determination has been made, and no assertion is made, as to whether any of the above might be applicable as prior art with regard to the present disclosure.

SUMMARY

It is an aim of certain examples of the present disclosure to address, solve, mitigate or obviate, at least partly, at least one of the problems and/or disadvantages associated with the related art, for example at least one of the problems and/or disadvantages mentioned herein. Certain examples of the present disclosure aim to provide at least one advantage over the related art, for example at least one of the advantages mentioned herein.

Certain examples of the present disclosure are defined by the independent claims. A non-exhaustive set of advantageous features that may be used in various examples of the present disclosure are defined in the dependent claims.

In accordance with an aspect of the present disclosure, there is provided a method for preventing counterfeiting of an object, the method comprising: capturing an image of at least a portion of the object, wherein the portion of the object whose image is captured is at least partially transparent, and wherein the captured image includes features of the internal structure of the object; generating, based on the image, a code that encodes features of the internal structure of the object; and recording the code.

In accordance with another aspect of the present disclosure, there is provided an apparatus for preventing counterfeiting of an object, the apparatus comprising: a camera for capturing an image of at least a portion of the object, wherein the portion of the object whose image is captured is at least partially transparent, and wherein the captured image includes features of the internal structure of the object; a processor for generating, based on the image, a code that encodes features of the internal structure of the object, and outputting the code.

In accordance with another aspect of the present disclosure, there is provided a method for authenticating an object, the method comprising: capturing an image of at least a portion of the object, wherein the portion of the object whose image is captured is at least partially transparent, and wherein the captured image includes features of the internal structure of the object; generating, based on the image, a code that encodes features of the internal structure of the object; reading one or more reference values comprising at least a reference code; and authenticating the object based on the code and the reference code.

In accordance with another aspect of the present disclosure, there is provided an apparatus for authenticating an object, the apparatus comprising: a camera for capturing an image of at least a portion of the object, wherein the portion of the object whose image is captured is at least partially transparent, and wherein the captured image includes features of the internal structure of the object; a reader for reading one or more reference values comprising at least a reference code; a processor for generating, based on the image, a code that encodes features of the internal structure of the object, and authenticating the object based on the code and the reference code.

In certain examples, generating the code comprises: applying a filter to the image to obtain a filtered image; and processing the filtered image to obtain a binary code.

In certain examples, the filter is a Gabor filter.

In certain examples, the filtered image C(x, y) is given by:

$$C(x,y)=I(x,y)*G(x,y)=\iint I(x,y)G(x-\eta,y-\xi)d\eta d\xi$$

where I(x, y) represent the image in grey-scale using Cartesian coordinates, C(x, y) is a complex number for each x and y, * denotes convolution, and G(x, y) is the Gabor filter defined by:

$$G(x, y) = \frac{f^2}{\pi\eta\gamma} \cdot \exp\left(\frac{\eta^2 x'^2 + \gamma^2 y'^2}{2\sigma^2}\right) \cdot \exp(2\pi i f x')$$

for $x' = x\cos(\theta) + y\sin(\theta)$ and $y' = -x\sin(\theta) + y\cos(\theta)$ where f is the frequency of the sinusoidal wave, $\eta$ and $\gamma$ are constant factors that together determine the spatial ellipticity of the Gabor wavelet, $\theta$ represents the orientation of the ellipticity, and $\sigma$ is the standard deviation of the Gaussian envelope.

In certain examples, processing the filtered image comprises applying a Gray code to the filtered image.

In certain examples, the Gray code is a two-bit Gray code for converting a complex number a+bi into two bits based on which quarter of the complex plane the complex number falls in, applying the Gray code comprises converting each element of the matrix C(x, y) into two bits according to the Gray code, and C(x, y) represents the filtered image.

In certain examples, the method further comprises encrypting the binary code, and recording the code comprises recording the encrypted binary code.

In certain examples, the method further comprises: generating a random key, k; obtaining a codeword $f_p$ by applying an error-correction encoding scheme, ErrorCC, to the random key according to $f_p$=ErrorCC(k), wherein $f_p$ has the same size as the binary code $f_a$; computing an encrypted binary code according to $r=f_a \oplus f_p$, where $\oplus$ denotes modulo-2 addition; and computing a hash value according to h=H(k), where H is a one-way hash function, wherein recording the code comprises recording r and h.

In certain examples, the method further comprises computing a digital signature, s, based on r and h, and recording the code comprises recording the digital signature.

In certain examples, the method further comprises: identifying a designated area of the captured image from which the code is generated; and correcting the captured image for any rotational and/or linear misalignment.

In certain examples, the designated area is indicated by a boundary, and a marker is provided at a predetermined position relative to the designated area for indicating a correct orientation of the designated area.

In certain examples, the method further comprises: identifying one or more artefacts in the captured image; and generating a mask for the image for masking the artefacts.

In certain examples, the method further comprises: illuminating one side of the object; and capturing the image from the other side of the object.

In certain examples, recording the code comprises one or more of: printing the code on the object; printing the code on the object in the form of a barcode or QR code; storing the code in a database; storing the code on a recording medium that is readable via short-range wireless communication; and storing the code on an electronically readable recording medium.

In certain examples, the object comprises paper, and the internal structure of the object comprises the texture of the paper resulting from the arrangement of fibres from which the paper is made.

In certain examples, the apparatus further comprises a light source for illuminating the portion of the object whose image is captured.

In certain examples, the reference values further comprise a reference hash value, and authenticating the object comprises: computing a codeword $f_p'$ according to $f_p'=f_s \oplus r$, where $f_s$ denotes the code, r denotes the reference code, and $\oplus$ denotes modulo-2 addition; applying an error correction code scheme to the codeword $f_p'$ to obtain a value k'; authenticating the object based on a comparison between a hash value computed from the value k' and the reference hash value.

In certain examples, the method further comprises verifying the one or more reference values based on a digital signature of the one or more reference values.

In accordance with another aspect of the present disclosure, there is provided a computer program comprising instructions arranged, when executed, to implement a method, device, apparatus and/or system in accordance with any aspect, embodiment, example or claim disclosed herein. In accordance with another aspect of the present disclosure, there is provided a machine-readable storage storing such a program.

Certain examples of the present disclosure provide a paper fingerprinting technique based on analyzing the translucent patterns revealed when a light source shines through the paper. These patterns represent the inherent texture of paper, formed by the random interleaving of wooden particles during the manufacturing process. These patterns can be captured, for example, by a commodity camera and condensed, for example into a compact 2048-bit fingerprint code. Certain alternative techniques focus on fingerprinting paper based on the paper "surface". However, capturing the surface alone may miss important distinctive features such as the non-even thickness, the random distribution of impurities, and different materials in the paper with varying opacities. On the other hand, the embedded paper texture may provide a more reliable source for fingerprinting than features on the surface. Certain examples of the present disclosure may achieve 0% false rejection and 0% false acceptance rates. In certain examples, extracted fingerprints may contain 807 degrees-of-freedom (DoF), which is much higher than the 249 DoF with iris codes (that have the same size of 2048 bits). The high amount of DoF for texture-based fingerprints makes certain examples of the present disclosure extremely scalable for recognition among very large databases; it also allows secure usage of the extracted fingerprint in privacy-preserving authentication schemes based on error correction techniques.

Other aspects, advantages, and salient features of the present disclosure will become apparent to those skilled in the art from the following detailed description, which, taken in conjunction with the accompanying drawings, disclose examples of the present disclosure.

DETAILED DESCRIPTION OF EXAMPLES OF THE DISCLOSURE

Figure 1:
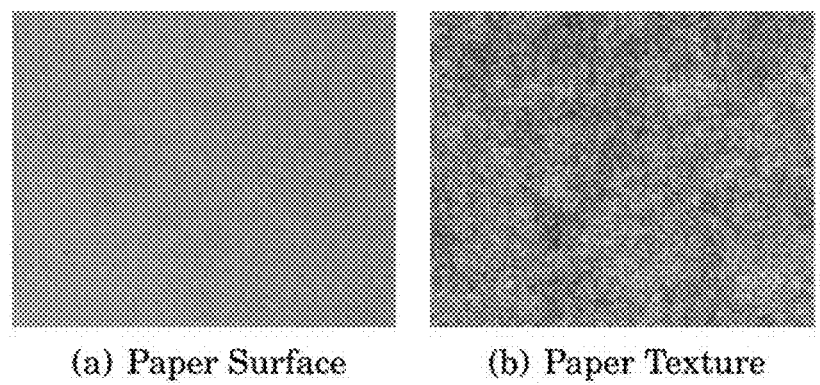
FIG. 1 illustrates the surface and texture of the same area of a paper sheet as captured by a camera based on a) reflective and b) transmissive light.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the present invention, as defined by the claims.

The terms and words used in this specification are not limited to the bibliographical meanings, but, are merely used to enable a clear and consistent understanding of the present disclosure.

The same or similar components may be designated by the same or similar reference numerals, although they may be illustrated in different drawings.

Detailed descriptions of elements, features, components, structures, constructions, functions, operations, processes, characteristics, properties, integers and steps known in the art may be omitted for clarity and conciseness, and to avoid obscuring the subject matter of the present disclosure.

Throughout this specification, the words "comprises", "includes", "contains" and "has", and variations of these words, for example "comprise" and "comprising", means "including but not limited to", and is not intended to (and does not) exclude other elements, features, components, structures, constructions, functions, operations, processes, characteristics, properties, integers, steps and/or groups thereof.

Throughout this specification, the singular forms "a", "an" and "the" include plural referents unless the context dictates otherwise. For example, reference to "an object" includes reference to one or more of such objects.

By the term "substantially" it is meant that the recited characteristic, parameter or value need not be achieved exactly, but that deviations or variations, including for example, tolerances, measurement errors, measurement accuracy limitations and other factors known to those of skill in the art, may occur in amounts that do not preclude the effect the characteristic, parameter or value was intended to provide.

Throughout this specification, language in the general form of "X for Y" (where Y is some action, process, function, activity, operation or step and X is some means for carrying out that action, process, function, activity, operation or step) encompasses means X adapted, configured or arranged specifically, but not exclusively, to do Y.

Elements, features, components, structures, constructions, functions, operations, processes, characteristics, properties, integers, steps and/or groups thereof described herein in conjunction with a particular aspect, embodiment, example or claim are to be understood to be applicable to any other aspect, embodiment, example or claim disclosed herein unless incompatible therewith.

It will be appreciated that examples of the present disclosure can be realized in the form of hardware, software or any combination of hardware and software. Any such software may be stored in any suitable form of volatile or non-volatile storage device or medium, for example a ROM, RAM, memory chip, integrated circuit, or an optically or magnetically readable medium (e.g. CD, DVD, magnetic disk or magnetic tape). It will also be appreciated that storage devices and media are examples of machine-readable storage that are suitable for storing a program or programs comprising instructions that, when executed, implement examples of the present disclosure.

One technique to prevent counterfeiting is based on measuring the unique physical properties of paper that are very difficult or impossible to clone.

Manufacturing a paper sheet is a complex process and each paper sheet is a unique product from that process. Typically, wooden particles are used as the base, and multiple substances are subsequently applied to stick these particles together to stabilize their placement and shape a thin, usually white, steady surface which we call paper.

The surface of a paper sheet is imperfect—it contains random non-evenness as a natural outcome of the paper manufacturing process. The surface imperfections may be utilized to uniquely identify the paper. In one approach, a focused laser beam may be used to scan a pre-designated region on the paper sheet from four different angles, and the intensity of the reflected laser may be continuously recorded. The recordings then constitute a unique digital representation of the paper, which may be called a "paper fingerprint".

A commodity scanner may be used to effectively extract paper fingerprints based on the same surface imperfections. A possible method is to scan the paper surface from four different angles and then construct a 3-D model. Then the 3-D model is condensed into a concise feature vector, which forms the paper fingerprint.

Another approach uses a microscope with a built-in LED as the light source to extract the paper speckle patterns at the microscopic level (e.g. 1-2 microns). This approach is based on the concept of speckles: i.e., when light falls on a paper sheet, the scattered light forms randomly mixed bright and dark regions, which can then be captured by a microscope. The captured image can be further processed to produce a compact binary fingerprint.

Certain techniques focus on the imperfections of the paper surface. In contrast, the wooden particles constituting the building blocks of a paper sheet scatter over the paper quite irregularly, and in certain examples of the present disclosure, this irregular placement of wooden particles provides a unique pattern, which can be extracted and used as a paper fingerprint. The unique pattern caused by the random interleaving of wooden particles may be referred to as the texture of paper.

Unlike techniques that measure the paper surface characteristics, certain examples of the present disclosure fingerprint a paper sheet based on measuring the paper texture patterns. The texture may be captured, for example by putting a light source on one side of the paper and using a commodity camera to take a photograph on the other side. This is based on the observation that putting a paper sheet under light will reveal irregular textural patterns, which may be visible even to the naked eye. FIG. 1 shows the difference between photos taken of the paper surface (based on reflective light) and of the paper texture (based on transmissive light).

The following description discloses certain aspects of paper fingerprinting, and certain exemplary techniques using the textural patterns revealed by passing light through a paper sheet as a reliable source for extracting a fingerprint (as opposed to measures which are based on paper surface imperfections). In addition, the following description discloses an exemplary paper fingerprinting algorithm based on error correction and image processing techniques, and results of experiments to show that such an algorithm can be used to efficiently extract a reliable and unique fingerprint using a photo taken by an off-the-shelf camera. Certain examples of the present disclosure are feasible and inexpensive to deploy in practice. In addition, the following description discloses further experiments to demonstrate that certain examples of the present disclosure are robust against: (a) non-ideal photo capturing settings such as when the paper is rotated and the light source is changed, and (b) non-ideal paper handling situations such as crumpling, soaking, heating and scribbling on the surface.

The skilled person will appreciate that the techniques describes herein are not limited to paper, but may be applied to any suitable physical object (e.g. an object that is at least partially transparent and/or that includes a detectable internal structure). In addition, the skilled person will appreciate that the specific implementations disclosed herein are merely exemplary, and that that various modifications may be made thereto without departing from the scope of the present disclosure. For example, in various examples one or more non-essential features (e.g. components, operations and/or method steps) may be omitted, and/or one or more optional features (e.g. components, operations and/or method steps) may be added. In addition, one or more feature (e.g. components, operations and/or method steps) may be replaced with equivalent or comparable features, or features for performing an equivalent or comparable function.

Paper Texture

When light falls on an object, it is partly absorbed, partly reflected, and partly transmitted, and paper is no exception. Absorption occurs based on the resonance principle: the energy of the light waves of a specific frequency is absorbed and transformed into kinetic energy by electrons of the same frequency. The part that is not absorbed, is either reflected or transmitted depending on how opaque (or conversely transparent) the paper is.

Different types of paper behave differently in terms of how much light they absorb, reflect or transmit. This behaviour depends, among other factors, on pulp material, density, thickness and coating substances. Opacity, as defined by the ISO 2471 standard (ISO. 2008. Paper and board Determination of opacity (paper backing) Diffuse reflectance method. ISO 2471:2008. International Organization for Standardization, Geneva, Switzerland), the entire contents of which are incorporated herein by reference, can be seen as an indicator of how much light is impeded from transmitting through the paper, with the opacity of 100% defined for fully opaque papers. Typical office printing paper, with grammage between 75 to 105 $g/m^2$, has opacity between 86% to 94%. To put this in perspective, opacity for newsprint paper (typical grammage: 40-49 $g/m^2$) is in the range 90-94% and for tracing paper (typical grammage: 60-110 $g/m^2$) is in the range 24-40%. These values suggest that a considerable proportion of light transmits through such paper, which forms the basis of our proposal to fingerprint paper based on its textural patterns.

Intuitively, the textural patterns created and stabilized throughout the paper in the process of manufacturing can provide a promising source for paper fingerprinting. These patterns are naturally occurring and appear random. Moreover, they are embedded within the bonded structure of the paper and hence are relatively well-protected against manual handling of paper. They are generated as a result of the wooden particles randomly interleaved during the manufacturing process. Finally, once in the finished product, the randomly interleaved wooden particles cannot be altered without damaging the paper, hence making any tampering act evident.

In certain examples, to capture the embedded textural patterns of paper and subsequently extract a fingerprint, a single photo may be taken, for example by a commodity camera. This provides a more practical and quicker solution than other techniques that have to take multiple scans (e.g. on paper surface), for example from four different angles, in order to compute a fingerprint. A single photo is feasible in certain examples of the present disclosure because the paper texture typically contains richer features than the paper surface, such as the thickness of the overlaying wooden particles, randomly distributed impurities, and different embedded materials with varying opacities. The results of experiments descried below show that a paper fingerprint can be reliably extracted from the textural patterns.

Examples of the present disclosure are applicable to a wide range of objects (e.g. paper objects). For example, a vast number of official and legal documents, certificates, official receipts and invoices are printed on regular office paper (sometimes with watermarks, holograms or other security measures), thermal paper, or other types of paper. A property that the majority of these types of paper have in common is that they are not completely opaque. This means that a considerable amount of light passes through them. Furthermore, embedded irregular textural patterns as a natural result of the manufacturing process seem to be a universal property of all these different types of paper. Consequently, there is considerable potential for exploiting paper fingerprints extracted from embedded textural patterns in order to validate the authenticity of such official and legal documents.

Texture Analysis

A high level description of an example of the present disclosure for capturing paper textural patterns and extracting a reliable and unique paper fingerprint from those patterns will now be described. To be able to capture paper textural patterns, a digital photograph is taken of the paper sheet through which light is projected. Then, a series of preparation operations are performed such as aligning and resizing of the original image. Afterwards, in the texture analysis phase, a 2-D Gabor filter (for example, as described in John G Daugman. 1985. Uncertainty relation for resolution in space, spatial frequency, and orientation optimized by two-dimensional visual cortical filters. *JOSA A* 2, 7 (1985), 1160-1169, the entire contents of which are incorporated herein by reference) is utilized to extract textural information from the captured image. The skilled person will appreciate that examples of the present disclosure are not limited to a Gabor filter, and that any other suitable type of filter or function may be used. Subsequently, a paper fingerprint extraction method is used that generates a binary string, the paper fingerprint. Once paper fingerprints are in the binary string format, they can be compared using any suitable method, such as computing the fractional Hamming distance between any two paper fingerprints.

The preparation phase, Gabor transform, the fingerprint generation method, and the fingerprint comparison method based on fractional Hamming distance will be described in more detail further below. In addition, further implementation details and settings of experiments will be discussed further below.

Preparation Phase

The preparation phase comprises operations of identifying the designated area of the photo which is to be used for fingerprint extraction and aligning the image in terms of movement and rotation. To indicate the fingerprinting area, a small rectangular box may be printed on the paper sheet. In addition, a filled square may be printed on the bottom left of the box, to allow automatic alignment.

Figure 2:
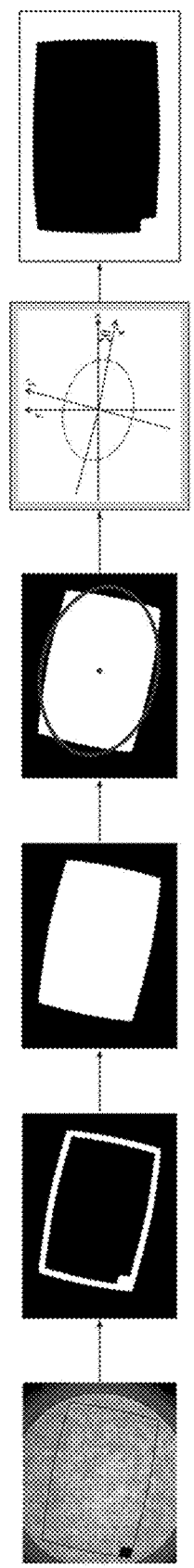
FIG. 2 illustrates a step-by-step rotation recognition process in the preparation phase of an example of the present disclosure.

FIG. 2 illustrates a step-by-step rotation recognition process in the preparation phase of an example of the present disclosure. The last step produces a mask that distinguishes the pixels containing reliable information suitable for feature extraction (black region) from the pixels containing unreliable information (white region).

As shown in FIG. 2, aligning the rotation of the image involves several steps. First, a photo of the fingerprinting area is obtained. The photo may be converted into grey scale. The printed region (the rectangular box and the filled square) can be identified by applying a grey-scale threshold. This threshold may be computed, for example, by the Otsu method (see, for example, Nobuyuki Otsu. 1975. A threshold selection method from gray-level histograms. Automatica 11, 285-296 (1975), 23-27, the entire contents of which are incorporated herein by reference), which chooses the threshold in a such way to minimize the interclass variance of black and white pixels. The same approach may be applied for both reflection and transmission analyses. The borders in both reflection and transmission samples may be recognized correctly using this technique. The result is a binary image: "0" for black and "1" for white. This thresholding may also produce some "noise" scattered around the image, but they can be removed based on area. To ensure the borders of the printed rectangle are connected, a convex hull of the outer pixels may be drawn to form a connected shape. This process also identifies artefacts, e.g., caused by pen scribbling (which are testes in the robustness experiments described below). The pixel positions of identified artefacts may be defined in a mask function, which are explained below.

Once the printed rectangle is identified, the region within the rectangular border may be filled up with the binary value '1' (white). The centre of the rectangular object may be identified. For example, the "centre of mass" of the object may be identified based on computing the first-order moment (for example, see Michael Reed Teague. 1980. Image analysis via the general theory of moments*. JOSA 70, 8 (1980), 920-930, the entire contents of which are incorporated herein by reference) and use that as the new origin of the Cartesian coordinate system. This corrects any misalignment due to paper movement.

Then, any misalignment caused by rotation may be corrected. This may be done based on computing second-order moments in the new Cartesian coordinate system (for example, see the Teague 1980 reference above). Let B(x, y) denote the binary 2D object in Cartesian coordinates representing the recognized rectangular box area. There are three second-order moments as follows:

$u_{20} = \iint x^2 B(x,y) dx dy$ $u_{11} = \iint xy B(x,y) dx dy$ $u_{02} = \iint y B(x,y) dx dy$ The rotation of the binary 2D object B(x, y) can now be calculated as follows:

$$\theta = \frac{1}{2}\tan^{-1}\left(\frac{2u_{11}}{(u_{20} - u_{02}) + \sqrt{(u_{02} - u_{20})^2 + 4u_{11}^2}}\right) \quad (1)$$

The above formula calculates the angle between the x axis and the major axis of an ellipse that has equal second moments to the recognized rectangular box. It gives the counter-clockwise rotation of the object with respect to the horizon. After e is calculated, the image can be rotated accordingly.

In the captured image, the borders of the rectangles may be slightly curved rather than being straight due to lens artefact. This slight curvature does not affect the alignment algorithm disclosed herein. The raw bitmap image acquired from the camera may be used instead of the processed (e.g. jpeg) image. This raw image is typically stored separately in the camera, for example in the ".rw2" format, and contains the raw information captured by the camera sensor without any processing.

After rotation is corrected, the image may be delimited to the lowest and highest x and y values of the coordinates of the pixels inside the recognized rectangular box. This image is denoted by I (x, y). Meanwhile, the mask for the image is calculated as M (x, y). This mask is a binary vector with the same dimensions as I (x, y) with the value '0' indicating the corresponding pixel in I (x, y) to be masked out from the Hamming distance computation. In general, two categories of pixels may be chosen to be masked out in certain examples of the present disclosure. The first is the pixels with the intensity greater than the threshold computed by the Otsu method (for example, see the above reference) and not considered as "scattered noise" in the border recognition phase. These include the printed rectangle, the filled square inside the box and any artefacts such as random pen scribbling. The second is the pixels outside the recognized box including all the edges in the picture. See the last diagram in FIG. 2 for an illustration. These pixels may be considered to contain unreliable information. They are identified as '0' in a binary mask vector (similar to the identification of eyelids and eyelashes in iris recognition, for example as described in John Daugman. 2003. The importance of being random: statistical principles of iris recognition. Pattern Recognition 36, 2 (2003), 279-291. Biometrics, the entire contents of which are incorporated herein by reference) and may be excluded in the subsequent Hamming distance comparison process.

Gabor Filter

Gabor filters are typically used for edge detection in image processing. Besides, they have been found to perform efficiently in texture discrimination. Gabor filters are able to extract both coherent and incoherent characteristics of textural patterns (for example, see John Daugman. 1993. High confidence visual recognition of persons by a test of statistical independence. Pattern Analysis and Machine Intelligence, IEEE Transactions on 15, 11 (November 1993), 1148-1161, the entire contents of which are incorporated herein by reference). Coherent properties are the patterns which remain unchanged between snapshots of the same sample while incoherent ones refer to the patterns which change between snapshots of different samples. The two dimensional Gabor wavelets are used in biometric recognition problems such as iris recognition, fingerprint recognition and face recognition. A Gabor filter's impulse response is basically that of a Gaussian filter modulated by a sinusoidal wave. Consequently, Gabor filters capture features in both the frequency and spatial domains. Generally speaking, a Gabor filter would consider the frequency of a pattern ("what") as well as the two-dimensional (2D) position of the pattern ("where") (for example, see the Daugman 1993 reference above). Let exp be the natural exponential function. The 2D Gabor wavelet is calculated as follows using Cartesian coordinates:

$$G(x, y) = \frac{f^2}{\pi \eta y} \cdot \exp\left(\frac{\eta^2 x'^2 + \eta^2 y'^2}{2\sigma^2}\right) \cdot \exp(2\pi i f x') \quad (2)$$

for $x' = x\cos(\theta) + y\sin(\theta)$ and $y' = -x\sin(\theta) + y\cos(\theta)$ where f is the frequency of the sinusoidal wave, $\eta$ and $\gamma$ are constant factors that together determine the spatial ellipticity of the Gabor wavelet, $\theta$ represents the orientation of the ellipticity, and $\sigma$ is the standard deviation of the Gaussian envelope.

Depending on the frequency of the sinusoidal wave and the orientation of their ellipticity, Gabor filters are capable of discriminating different textural characteristics. Usually, Gabor filters with a range of different frequencies, known as scales, and a range of different orientations are applied to find out the best combination of scale and orientation for a specific texture analysis problem. For a fixed maximum frequency $f_{max}$ and a maximum of U scales, each scale index u defines the frequency f used in Equation 2 as follows:

$$\forall u \in \{1, 2, \ldots, U\}: f = \frac{f_{max}}{\sqrt{2}^{u-1}} \quad (3)$$

For a maximum of V orientations, we consider V angles equally distributed from 0 to $\pi$. Each orientation index v defines the orientation $\theta$ used in Equation 2 as follows:

$$\forall v \in \{1, 2, \ldots, V\}: \theta = \frac{v-1}{V}\pi \quad (4)$$

A Gabor filter is applied to grey-scale images. Let I (x, y) represent the grey-scale image using Cartesian coordinates. The result of the application of Gabor filter G(x, y) is simply the 2D convolution of I and G as follows:

$$C(x,y) = I(x,y) * G(x,y) = \iint I(x,y) G(x-\eta, y-\xi) d\eta d\xi$$

The result C (x, y) is a complex number for each x and y. C (x, y) can be alternatively viewed as a matrix with the discrete values of x and y mapped to the columns and rows. Throughout the paper, functions defined over Cartesian coordinates and matrices are used interchangeably.

Fingerprint Generation

Figure 3:
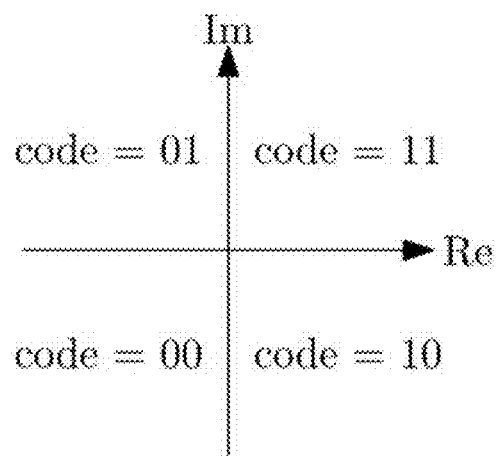
FIG. 3 illustrates a Gray code for a complex value $m_{ij}$=a+bi in the complex plain.

A fingerprint generation method according to an example of the present disclosure takes the output of a Gabor filter and produces a binary string. Let the element located in row j and column k of the matrix C (x, y) be $m_{jk} = a+bi$. A 2-bit Gray code is defined based on which quarter of the complex plane the element $m_{jk} = a+bi$ falls in (see FIG. 3). For example, when a and b are both positive, the encoded value will be 11. Thus, every element in the matrix is replaced by two bits. The result is a binary string which may be referred to as the paper fingerprint.

Fractional Hamming Distance

After paper fingerprints are generated, fractional Hamming distance between any two fingerprints can be used to compare them. Hamming distance is simply the number of positions in which the bits disagree between two fingerprints. This is a classical bit error rate (BER) metric in communication. Fractional Hamming distance is the normalized version, resulting a value between 0 and 1. Masking may be used to discard the effect of irrelevant bits in a fingerprint. For each fingerprint, a mask is defined as a binary string of the same length in which bits corresponding irrelevant positions are set to 0 and bits corresponding effective positions are set to 1. The masks are calculated in the preparation phase as discussed above. Given two fingerprints $f_1$ and $f_2$, and their corresponding masks $m_1$ and $m_2$, the fractional Hamming distance is calculated as follows:

$$HD(f_1, f_2, m_1, m_2) = \frac{\|(f_1 \oplus f_2) \cap m_1 \cap m_2\|}{\|m_1 \cap m_2\|} \quad (5)$$

where $\oplus$ denotes the bitwise exclusive-OR (XOR) operation and $\cap$ denotes the bitwise AND operation. A relatively small fractional Hamming distance indicates that the two fingerprints are likely to belong to the same paper sheet, while a relatively large fractional Hamming distance (for example, around 0.5) indicates that the two fingerprints are likely to belong to different paper sheets. In the following, the expression Hamming distance (or HD for short) is used to refer to fractional Hamming distance.

Evaluation

In order to evaluate the above method for paper fingerprinting, several datasets may be collected in different situations. In the following, the parameter settings and configurations of an exemplary implementation under which the evaluations may be carried out are first explained. Then, the details of the evaluation framework that may be used to assess the results are provided. In particular, metrics used for evaluating the effectiveness of biometric systems as well as those used for evaluating the effectiveness of physical unclonable functions (PUFs) may be considered, since paper fingerprints can be seen as both. Subsequently, results are given that justify certain choices in terms of how the datasets are collected and the settings used for the Gabor filter. Finally, the details of the main dataset collection are given and the results are provided, including evaluation of the method against biometric and PUF metrics.

Parameter Settings and Configurations

Figure 10:
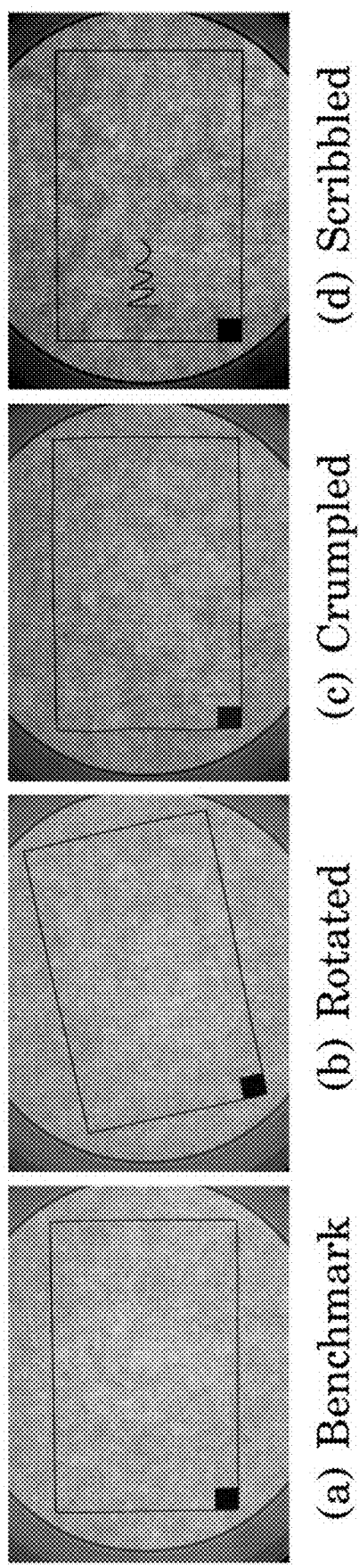
FIG. 10 illustrates a captured photo under near-ideal and non-ideal situations.

In order to obtain consistent fingerprints, a relatively small but fixed part of a sheet of paper may be used as a source of fingerprint extraction. A rectangular box (e.g. 37 mm×57 mm) may be printed on the sheet to indicate this area. In addition, a small filled square (5 mm×5 mm) may be printed in a corner (e.g. at the bottom left) of the box (see FIG. 10). Using this small square, in the preparation phase the method can check that the rotation has been carried out correctly (distinguishing cases when the paper is placed upside-down or flipped).

In an exemplary implementation, the original photos may be 3456×4608 pixels, for example. After the preparation phase, a corrected and delimited image of variable size may be obtained, ranging between around 2300×3300 pixels to 2350×3350 pixels, for example. This image may then be resized, for example to a 640×640 pixel image/which is then given as input to the Gabor filter. The rectangular size conversion is for the convenience of applying Gabor wavelets in the next stage to produce, for example 2048 bits in the output (the same size as an iris code). A Gabor impulse response of, for example size 100×100 may be used, and the output of Gabor filter, C, may be a complex matrix of, for example size 640×640. This matrix may be downsampled to one of size 32×32, for example, before being given as input to the fingerprint generation algorithm. This downsampling process is done by simply picking the elements in, for example every 20th row and 20th column. Fingerprint generation replaces each complex value with, for example two bits. Hence, the final paper fingerprint is a string of size 2×32×32=2048 bits in this example.

The output of the Gabor filter may be downsampled for two reasons. First, it makes the data storage more compact. With 2048 bits (256 bytes), the fingerprint may be stored in a QR code as part of an authentication protocol (explained in more detail below). Second, adjacent pixels in the image are usually highly correlated. Hence, downsampling serves to break the correlation between bits. This simple downsampling technique can be effective to produce reliable and unique fingerprints.

Figure 4:
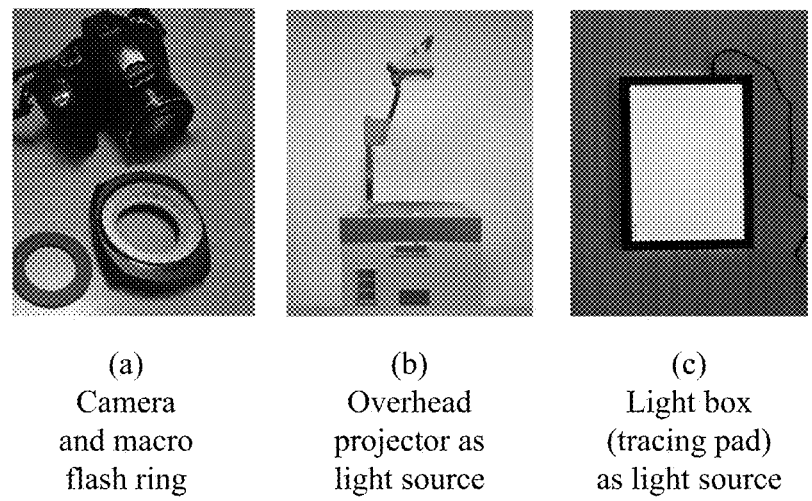
FIG. 4 illustrates an exemplary implementation according to the present disclosure.

In an exemplary implementation, images may be captured, for example by a Panasonic DMC-FZ72 camera with a resolution of 16.1 Mega-pixels. This type of camera may be chosen for two main reasons: the ability to capture a photo in macro mode from a short distance (e.g. minimum 1 cm focus) and the ability to mount a macro flash ring over the lens. However, these characteristics are not unique to this specific camera and many other cameras available in the market provide the same characteristics. An off-the-shelf common macro flash ring may be mounted on the camera lens, to maintain a constant distance between the lens and the paper surface where the texture is photographed. The camera and its accessories in an exemplary implementation are shown in FIG. 4(a). In certain examples, it is not necessary to use the flash of the macro flash ring; the light source may be an ordinary office overhead projector as shown in FIG. 4(b). The light that the overhead projector provides is intense and adjustable. Furthermore, it has a flat surface with constant distance from the light source. This allows the paper to be put on the surface and then the macro ring resting on top of it before the camera takes a photo of the paper texture. The use of the macro ring also serves to shield the effects of other ambient light sources (e.g., daylight, office lighting). The effect of the light source by using an alternative source: for example a commodity light box (e.g. a tracing pad) as shown in FIG. 4(c), is discussed below.

Evaluations may be performed on a PC, for example with an Intel Core i7-2600S CPU @ 2.80 GHz with 8 GB of memory. The operating system may be, for example 64-bit Windows 7 Enterprise. Matlab R2015a (64-bit) may be used to implement the algorithms.

Evaluation Framework

The techniques disclosed herein may be regarded as related to the fields of biometrics and Physical Unclonable Functions (PUFs). Biometrics is the science of authenticating humans by measuring their unique characteristics and have a long history of research. A paper fingerprint works similar to biometrics, except that it measures unique characteristics of a physical object instead of a human being. Hence, common metrics that measure the error rate performance of a biometric system apply to the techniques described herein. On the other hand, paper fingerprints may be regarded as related to Physical Unclonable Functions. Typically PUFs require a challenge and response dynamic, but according to a certain definition (for example disclosed in Roel Maes. 2012. Physically unclonable functions: Constructions, properties and applications. Ph.D. Dissertation. Katholieke Universiteit Leuven, the entire contents of which are incorporated herein by reference), paper may be regarded as a "non-intrinsic" PUF, i.e., a PUF that does not contain the circuitry to produce the response on its own. Hence, the same evaluation methods in PUF are also applicable to paper fingerprints.

Because of the relation to these two fields and their respective evaluation frameworks, an exemplary implementation according to the present disclosure may be evaluated based on metrics used in both fields for a comprehensive analysis. Biometric or PUF metrics may be used. However, using both allows a meaningful comparison with related biometrics and PUF systems to be performed. The relationships between these metrics may be analyzed, and a unified framework may be defined that can be applied to evaluate both biometric and PUF systems.

In the following a brief description of these metrics is given. There is discussed Hamming distance distributions, decidability, and recognition rates including false rejection and false acceptance rates in the former category of metrics. In the latter category, uniformity and randomness in the space dimension, reliability and steadiness in the time dimension, and uniqueness and bit aliasing in the device dimension are considered.

1) Biometric Metrics: A biometric authentication problem is a specific case of a statistical decision problem in which one decides if two given biometric measurements belong to the same source or not. In order to provide necessary information about the effectiveness of such a biometric, the parameters of the so-called biometric decision landscape need to be specified (for example, see John Daugman. 2000. Biometric decision landscapes. Technical Report UCAM-CL-TR-482. University of Cambridge, the entire contents of which are incorporated herein by reference). If Hamming distance is used for comparison, as it is in the present example, the distributions of Hamming distance for two groups of comparisons need to be determined: for comparisons between paper fingerprints originating from the same paper sheet, and for comparisons between paper fingerprints originating from different paper sheets. These are called same-group and different-group distributions, respectively.

For an effective biometric, the same-group and different-group distributions should be well-separated. This makes the decision problem solvable. Let $\mu_1$ and $\mu_2$ denote the means, and $\sigma_1$ and $\sigma_2$ the standard deviations of the two distributions. The decidability metric d' may be defined as follows:

$$d' = \frac{|\mu_1 - \mu_2|}{\sqrt{\frac{\sigma_1^2 + \sigma_2^2}{2}}} \tag{6}$$

where |•| denotes absolute value. Decidability as defined above is indicative of how well-separated the two distributions are: the further and the more concentrated the distributions are, the higher will the decidability be. To give an idea about typical values, the decidability of iris recognition, a well-established and effective biometric method, is d'≈14 in an ideal measurement environment and d'≈7 in a non-ideal environment (for example, see John Daugman. 2004. How iris recognition works. Circuits and Systems for Video Technology, IEEE Trans-actions on 14, 1 (2004), 21-30, the entire contents of which are incorporated herein by reference).

After determining the same-group and different-group distributions, one decides a threshold value situated between the two distributions. Subsequently, the decision on whether two reported biometrics belong to the same origin or not is then made by computing the Hamming distance between the two biometric samples and comparing it to the threshold. For an effective biometric, measurements from the same origin have relatively low Hamming distance and hence fall below the threshold, whereas measurements from different origins have relatively high Hamming distance and fall above the threshold. If the distributions are completely separated, the decision is correct all the time. However in practice usually there is some overlap between the two distributions. The proportion of biometrics from different origins falsely accepted as being from the same origin is known as the false acceptance rate (FAR). The proportion of biometrics from the same origin falsely rejected as being from different origins is known as the false rejection rate (FRR). For an effective biometric FAR and FRR should be low—ideally zero.

A widely used measure of effectiveness of a biometric is degrees of freedom (DoF). DoF is a measure of the combinatorial complexity of the biometric test, or in other words the number of bits in a biometric measurement that are independent (for example, see the Daugman 2004 reference above). Consider a biometric that provides degrees of freedom N, that is, N independent and unpredictable bits. A comparison between two such biometrics from different origins can be modelled as the probability that a threshold number of N independently chosen bits agree. Hence, the different-group distribution for such a biometric would follow the binomial distribution with mean $\mu=p$ and variance $\sigma^2=Np(1-p)$, where p is the probability of single bit agreement. Hence, the degrees of freedom for a biometric with a different-group distribution that follows a binomial distribution with mean $\mu$ and variance $\sigma^2$ can be calculated as follows:

$$N = \frac{\mu(1-\mu)}{\sigma^2} \quad (7)$$

2) PUF Metrics: Paper fingerprinting can be seen as an optical physical unclonable function (PUF). Evaluating results against established PUF metrics provides further information about the effectiveness of the techniques described herein.

Herein, a unified framework is followed, which provides metrics to evaluate a PUF in three dimensions: space, time, and device (for example, see Abhranil Maiti, Vikash Gunreddy, and Patrick Schaumont. 2013. A systematic method to evaluate and compare the performance of physical unclonable functions. In Embedded systems design with FPGAs. Springer, 245-267, the entire contents are incorporated herein by reference). In the techniques described herein, PUFs are the paper fingerprints, and devices are the different paper sheets. Each of these dimensions quantifies a specific quality of a fingerprint: the space dimension analyses the overall variations of fingerprints, the time dimension indicates same-group consistency, and the device dimension discusses the different-group diversity of fingerprints.

Before describing these dimensions, the symbols used in this frame-work are defined. Here we consider effective fingerprints, denoted by r. The effective fingerprint is the result of applying the appropriate mask over the original fingerprint f. The following parameters are used: L is the number of bits in each fingerprint (2048 in one example). T refers to the number of samples taken from each paper sheet in a dataset (e.g., in an exemplary benchmark dataset T=10). N is the total number of paper sheets involved in a dataset (e.g., in an exemplary benchmark dataset N=100). The following indices may be used accordingly: n denotes the paper sheet number within different sheets, t represents the sample number within the samples from the same paper sheet, and l shows l-th bit in the effective fingerprint.

Space Dimension. This dimension is concerned with bit variations with respect to the locations of the bits in fingerprints. Metrics in this dimension evaluate the overall inter-sheet behaviour of fingerprints.

Uniformity: This metric shows how uniform 0s and 1s are in a fingerprint. The ideal value for this metric is 0.5. Uniformity of the fingerprint from the t-th sample and n-th sheet is calculated as follows:

$$\text{Uniformity}(n, t) = \frac{1}{L} \sum_{l=1}^{L} r_{n,t,l} \quad (8)$$

Randomness: This metric indicates the average randomness of the bits in the fingerprints generated from several acquisitions from a sheet. The ideal value for this metric is 1. Randomness of the fingerprint bits generated from the n-th sheet is calculated as follows:

$$\text{Randomness}(n) = -\log_2 \max(p_n, 1 - p_n), \quad (9)$$

$$\text{where } p_n = \frac{1}{TL} \sum_{t=1}^{T} \sum_{l=1}^{L} r_{n,t,l}$$

Time Dimension. This dimension is concerned with fingerprint variations within multiple samples. Metrics in this dimension evaluate the overall intra-sheet persistence of fingerprints within multiple samples.

Reliability: This metric shows how consistently fingerprints are reproduced by the same sheet. The ideal value for this metric is 1. Reliability of the fingerprints generated from the n-th sheet is calculated as follows:

$$\text{Reliability}(n) = 1 - \frac{2}{T(T-1)L} \sum_{t_1=1}^{T-1} \sum_{t_2=t_1+1}^{T} \sum_{l=1}^{L} (r_{n,t_1,l} \oplus r_{n,t_2,l}) \quad (10)$$

Steadiness: This metric indicates the bias of individual fingerprint bits on average for a sheet. The ideal value for this metric is 1. Steadiness of the fingerprints generated from the n-th sheet is calculated as follows:

$$\text{Steadiness}(n) = 1 + \frac{1}{L} \sum_{l=1}^{L} \log_2 \max(p_{n,l}, 1 - p_{n,l}) \quad (11)$$

$$\text{where } p_{n,l} = \frac{1}{T} \sum_{t=1}^{T} r_{n,t,l}$$

Device Dimension. This dimension is concerned with fingerprint variations between multiple sheets. Metrics in this dimension evaluate the overall inter-sheet distinguishability of fingerprints.

Uniqueness: This metric represents how distinguishable a sheet is within a group of sheets. The ideal value for this metric is 0.5. Uniqueness of the fingerprints generated from the n-th sheet is calculated as follows:

$$\text{Uniqueness}(n) = \frac{1}{T^2 L(N-1)} \cdot \sum_{t=1}^{T} \sum_{\substack{n'=1 \\ n' \neq n}}^{N} \sum_{t'=1}^{T} \sum_{l=1}^{L} (r_{n,t,l} \oplus r_{n',t',l}) \quad (12)$$

Aliasing: This metric indicates how likely different sheets are to produce identical fingerprint bits. The ideal value for this metric is 0.5. Bit-aliasing of the I-th bit of the fingerprints generated from a dataset is calculated as follows:

$$\text{Bit-Aliasing}(l) = \frac{1}{NT} \sum_{n=1}^{N} \sum_{t=1}^{T} r_{n,t,l} \quad (13)$$

Reflectance vs. Transmission

As discussed before, certain examples of the present disclosure capture paper textural patterns and efficiently extract unique paper fingerprints from such patterns using a camera. By contrast, other techniques extract paper fingerprints from the paper surface. In certain examples of the present disclosure, textural patterns revealed by the transmissive light typically contain richer features than the paper surface shown by the reflective light. To demonstrate this, the following investigates the difference between the two patterns.

Figure 5:
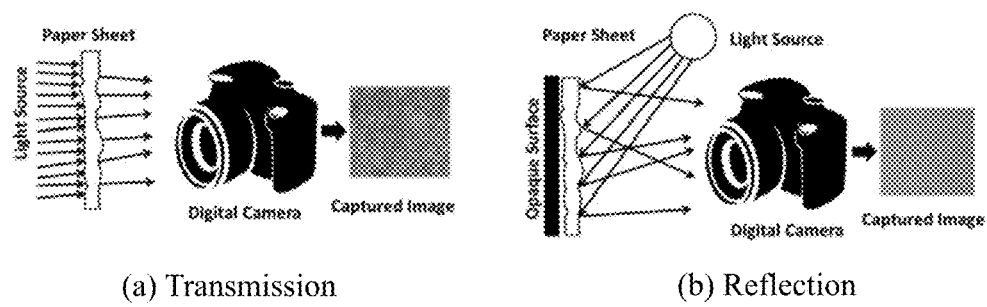
FIG. 5 illustrates capturing a photo, in case of (a) transmission, and (b) reflection, using the same digital camera and light source.

The paper photographing may be set up in two settings: one with the light source on the same side of the paper and the other with the light source on the opposite side of the paper (see FIG. 5). In the former, an opaque object may be put behind the paper, so only the paper surface is photographed based on the reflective light. 10 common A4 (210× 297 mm) paper sheets with grammage 80 g/m² may be selected. 10 photos of each sheet may be taken in each of the two settings. A common overhead projector may be used as the light source. The effect of any ambient light may be reduced by setting the data collection environment in a dark room. This data collection results in two datasets: a 100-sample dataset (10 sheets with 10 samples for each sheet) for surface measurements and a 100-sample dataset (10 sheets with 10 sample for each sheet) for textural measurements.

Figure 6:
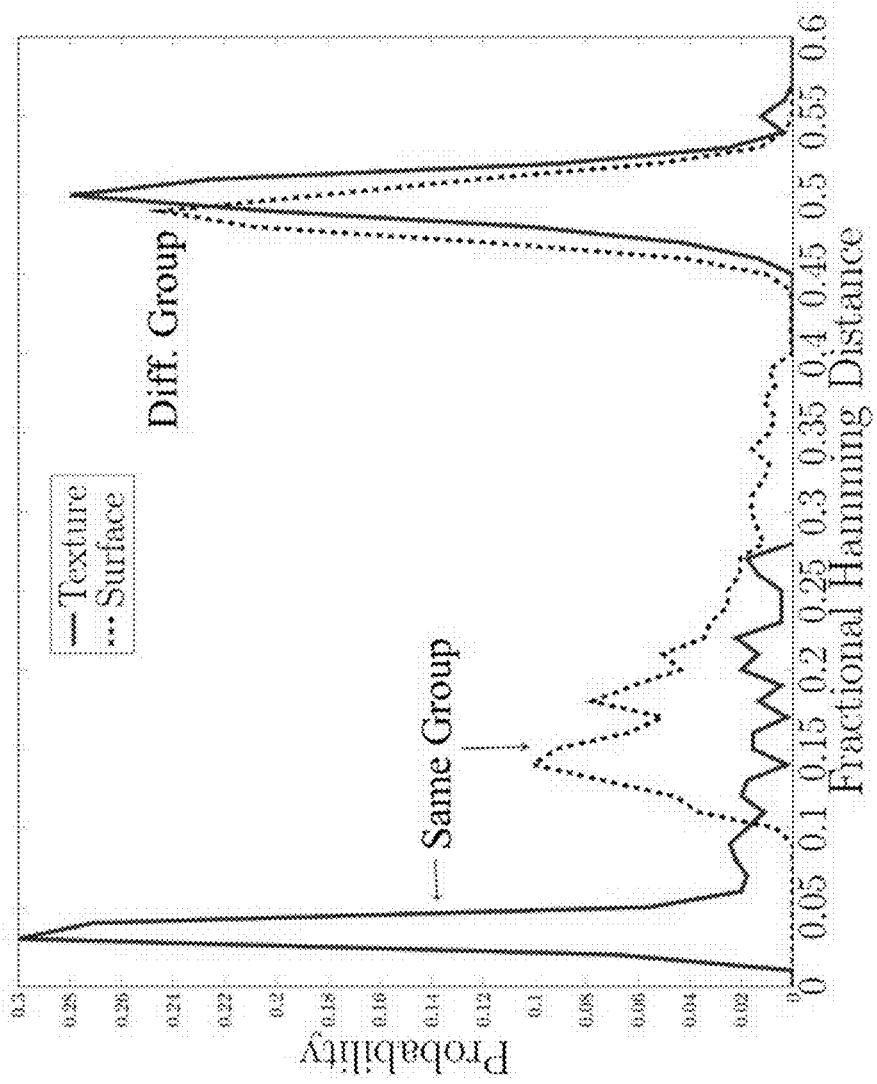
FIG. 6 illustrates Hamming distance distributions for surface and texture.

After the data collection, the fingerprint extraction algorithm (as discussed above) may be performed for both datasets. FIG. 6 shows the Hamming distance distributions for the two cases. Each diagram depicts four distributions: for each case i.e., surface and texture, there is one curve, concentrated around lower values of Hamming distance, showing the distribution of Hamming distance between pairs of fingerprints of the same paper sheet, and a second curve, concentrated around a Hamming distance value of about 0.5, showing the distribution of Hamming distance between pairs of fingerprints of different paper sheets.

Ideally, for effective fingerprint recognition, we want the "same-group" and "different-group" distributions to be as separate as possible, since then a threshold can easily be decided on and any two fingerprints with a Hamming distance below that threshold may be considered to belong to the same paper sheet, and any two fingerprints with a Hamming distance above that threshold may be considered to belong to different paper sheets.

As can be seen in FIG. 6, the two distributions, i.e., "same-group" and "different-group", are well-separated in the case of texture, but less so in the case of surface. In fact, in the case of texture, the minimum Hamming distance for different comparisons is 0.46 and the maximum Hamming distance for similar comparisons is 0.27, which shows that there is no overlap between the two distributions. However, in the case of surface, the minimum Hamming distance for different comparisons is 0.44 and the maximum Hamming distance for similar comparisons is 0.48, which shows that there is some overlap between the two distributions, and hence false negative or false positive decisions are inevitable in this case. Indeed, decidability for the case of texture is around 20, but for the case of surface it is around 6. Furthermore, the number of degrees of freedom provided by the texture is slightly higher than that provided by the surface. These results support the view that the textural measurements through transmissive light contain more distinctive features than surface measurements based on reflective light, and hence can be used as a more reliable source for paper fingerprinting.

In the above, a specific image capturing condition, in which only one snapshot is taken, is used. However, a method that is based on taking a single snapshot is easier and quicker than those that require multiple measurements.

Determining Gabor Scale and Orientation

As discussed, Gabor filter can be configured with different scales and orientations. To find out the appropriate combination of scales and orientation for our method, we set up an initial experiment. We collected a dataset including two sub-datasets: the first one includes 20 samples from one paper sheet; the second one includes one sample from each of 20 paper sheets. These two sub-datasets constitute our same-group and different-group data, respectively. We applied Gabor filter for 8 orientations, indexed from 1 to 8, representing angles 0, π/8, π/4, 3π/8, π/2, 5π/8, 3π/4, and 7π/8. Considering $f_{max}$=0.25, we also considered multiple scales, indexed by integer values starting from scale 1. We used fixed values of η=γ=√2 and σ=1.

Preferably, the different-group distribution should be centred around 0.5 or a mean very close to 0.5. For scales greater than 7, the mean of the different-group distribution falls below 0.45, which indicates undesirable bias on the binomial distributions (i.e., "tossing a coin" is no longer random in the a Bernoulli trial). Therefore, in the following the scope of the investigation is limited to scales from 1 to 7.

Calculations show that as the scale increases, the decidability of the distributions increases, but at the same time the number of the degrees of freedom the different-group distribution provides decreases. This is because the scale relates to the spatial frequency components of the Gabor filer—the smaller the scale is, the more detailed the feature extraction is. When the scale is one, the finest detail of the paper texture is extracted, which leads to high degrees of freedom in the generated fingerprint. However, at this scale, the image processing is extremely sensitive to noise, which reduces the separation between the same-group and different-group histograms of Hamming distances. Increasing the scale results in a zooming-out effect. More correlations between bits are introduced, which reduces the degrees of freedom. But on the other hand, the feature extraction is more tolerant of noise. As a result, the same-paper and different-paper characteristics become more distinctive, which leads to a higher decidability.

Figure 7:
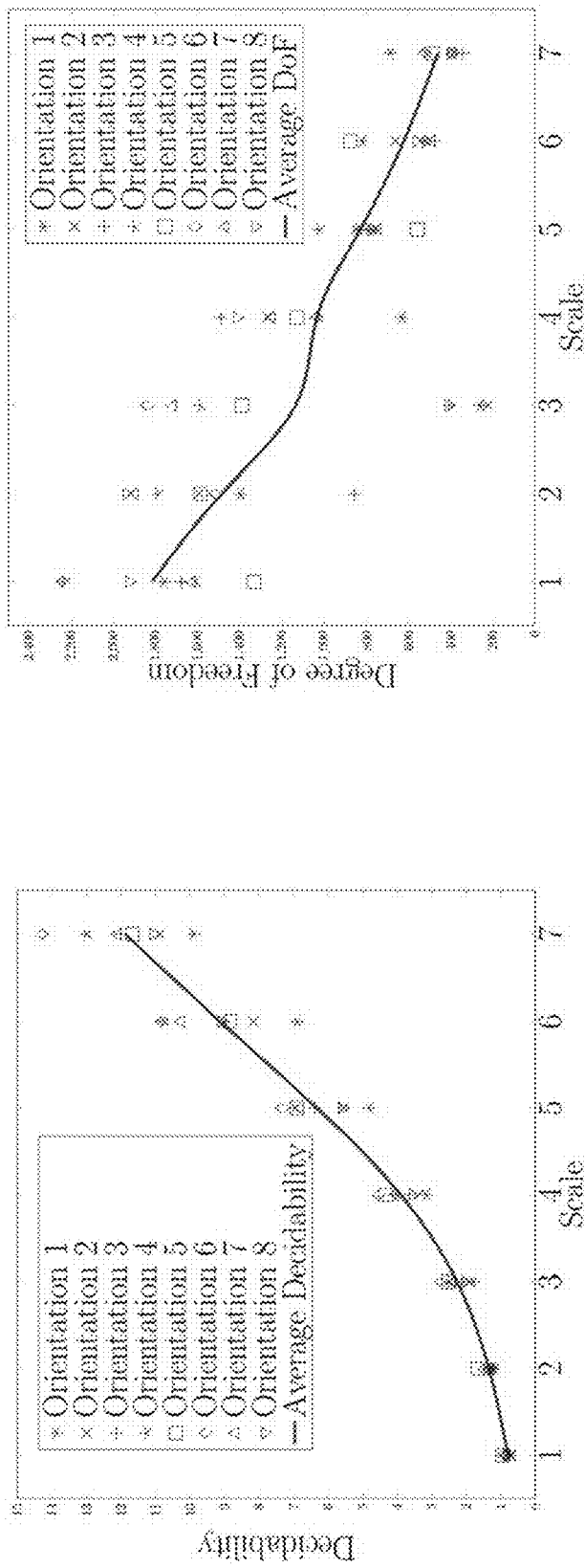
FIG. 7 illustrates results of (a) decidability and (b) degrees of freedom in scales 1 to 7 and orientations 1 to 8.

The results for decidability and degrees of freedom for orientations 1 to 8 and scales 1 to 7 are shown in FIGS. 7(a) and 7(b), respectively. Both figures also include a spline interpolation of average values of different orientation results within each scale to highlight the dominant trends. Therefore, there is an evident trade-off in choosing the scale and orientation. Too low a scale would not provide an acceptable decidability, while too high a scale would not provide a reasonable degree of freedom. Through experiments, it has been found that the combination of scale 5 and orientation 7 provides a good trade-off between decidability and degrees of freedom. As explained later, this combination provides nearly perfect recognition rates. In the following, findings based on this specific configuration of Gabor filter are described.

The Benchmark Dataset

The main dataset on which the evaluations are reported is a set of 1000 samples collected by taking 10 photos of each of 100 different paper sheets to provide a good diversity. Typical office paper sheets are used of size A4 (210 mm×297 mm) with grammage of 80 g/m$^2$. All the sheets were from the same pack with the same brand. In all of the photos, camera settings including aperture and exposure time were kept constant. It was attempted to keep the paper sheets visually aligned for the different samples, and separate experiments were conducted to evaluate the robustness of our algorithm against rotations (which are discussed below Section 5). The main dataset collected here under relatively stable conditions are referred to as the benchmark dataset.

Experiment Results

In the following, results are presented of experiments reporting the metrics described above. Also presented are the timing measurements for the method and a short discussion is provided on its practicality. Comparisons are provided with existing techniques whenever the relevant metrics are reported in the literature.

Figure 8:
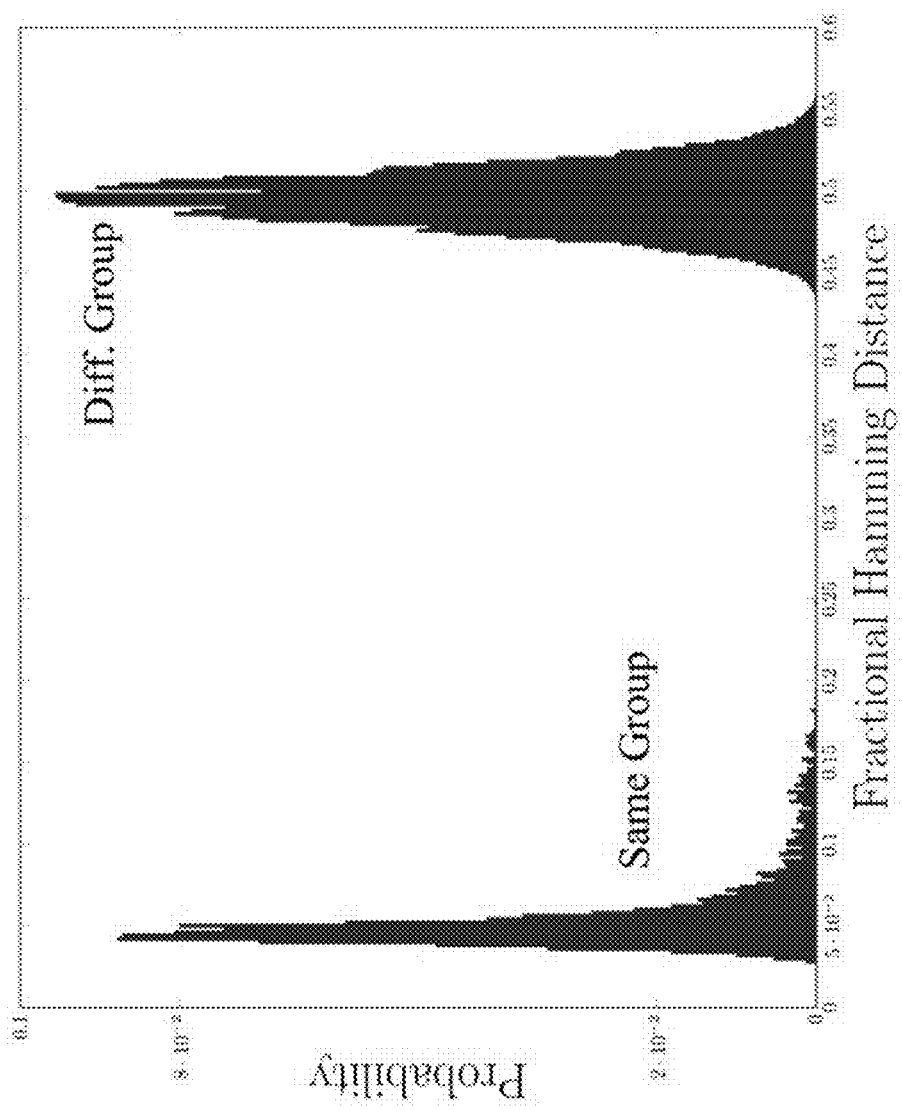
FIG. 8 illustrates Hamming distance distributions in a benchmark dataset.

Biometric metrics. The Hamming distance was calculated for all comparisons, consisting of same-group comparisons and different-group comparisons. There are a total of $_{1000}C_2$=499,500 comparisons, of which $100 \cdot _{10}C_2$=4,500 are same-group comparisons and (1000×990)/2=495,000 are different-group comparisons. FIG. 8 shows the distributions for the same-group and different-group Hamming distance values. Clearly, the two distributions are well-separated, which shows the effectiveness of the paper fingerprinting method according to examples of the present disclosure. Indeed, the maximum same-group Hamming distance is 0.24, whereas the minimum different-group Hamming distance is 0.42, which shows that there is no overlap between the two distributions. Hence, any threshold between the above values would give FAR and FRR of zero. As an example, the threshold can be chosen to be 0.4, but this is adjustable. Detailed error rate performance will be described below.

Figure 9:
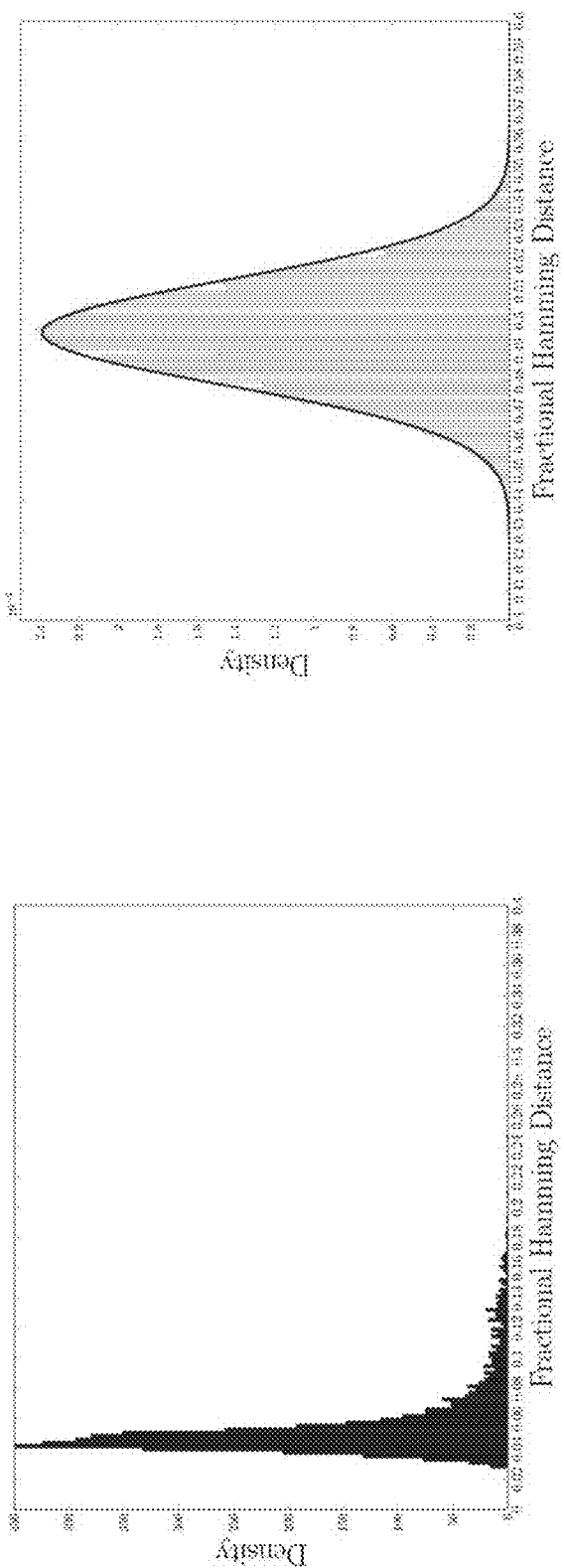
FIG. 9 illustrates histograms of Hamming distances in the benchmark dataset.

Decidability for the dataset is d'≈21, which compares favourably to d'≈14 for iris recognition in the ideal condition (see the Daugman 2003 reference above). The number of degrees of freedom is calculated based on Equation 7 as N=807, which means the entropy of the extracted fingerprints is 807 bits out of a total of 2048 bits. As compared to the 249 degrees of freedom for iris (which has the same size of 2048 bits), the fingerprint in our case is more unique and contains less redundancy. FIG. 9 shows the histogram of same-group Hamming distance values on the left and the distribution of different-group Hamming distance values on the right. The diagram on the right also includes a binomial distribution curve with degrees of freedom N=807, mean μ=0.495, and standard deviation σ=0.018. Evidently, the different-group distribution closely follows the binomial distribution.

PUF evaluations results. The PUF metrics results on the benchmark dataset are shown in Table II under the column labelled "Benchmark Dataset". It can be seen that in all metrics our dataset performed close to ideal values. For comparison, we also included in Table II the PUF metrics for two typical PUFs: Arbiter PUF, and Ring Oscillator PUF (for example, see Abhranil Maiti, Vikash Gunreddy, and Patrick Schaumont. 2013. A systematic method to evaluate and compare the performance of physical unclonable functions. In Embedded systems design with FPGAs. Springer, 245-267, the entire contents of which are incorporated herein by reference). This shows that our method provides fingerprints with good uniformity, randomness, reliability, steadiness, uniqueness, and bit-aliasing.

Timing Results & Usability. An exemplary implementation of the paper fingerprinting method described herein takes 1.30 seconds on average to prepare the photo, analyse the texture, and generate the fingerprint on a PC. This is reasonably fast. This is in contrast with other methods, which require four scans in different directions and then constructing a 3D surface model. 3D modeling is generally considered a computationally expensive task.

The whole process of paper fingerprinting in an exemplary implementation of the method described herein is automatized and only requires a user to place the sheet of paper on the flat surface of the light source (e.g. overhead projector) and click a button to take a photo (e.g. by a fixed camera). The example illustrated in FIG. 4 may be regarded as a proof-of-concept prototype to demonstrate the feasibility of extracting the fingerprint based on the textural patterns. Other implementations may be improved, for example by tighter integration of various equipment components. For example, at a border control, when the official swipes a page in the passenger's passport through a slot, the slot may have the embedded light source on one side and a camera on the other side. When the page is in the slot, a unique fingerprint can be extracted. The fingerprinting area and orientation will be relatively fixed as it is determined by the dimensions of the slot. By comparing the extracted fingerprint with a reference sample (e.g., stored in the back-end system), the computer program can quickly determine if the passport page is genuine. Further details on how to utilize the unique paper fingerprint in authentication protocols are described below.

TABLE I

False recognition rates of all datasets considering a fractional HD threshold of 0.4

| Rate | Ideal Value | Benchmark Dataset | Rotated | Crumpled | Scribbled | Soaked | Heated | Mixed Light |
|------|-------------|-------------------|---------|----------|-----------|--------|--------|-------------|
| FAR  | 0%          | 0%                | 0%      | 0%       | 0%        | 0%     | 0%     | 0%          |
| FRR  | 0%          | 0%                | 0.32%   | 3.2%     | 0%        | 0%     | 0%     | 0%          |

TABLE II

PUF metrics for all datasets and two typical PUFs

| PUF Metrics | Ideal Value | Arbiter PUF (APUF) [Maiti et al. 2013] | Ring Oscillator PUF [Maiti et al. 2013] | Benchmark Dataset |
|-------------|-------------|----------------------------------------|------------------------------------------|-------------------|
| Average Uniformity   | 0.5 | 0.556 | 0.505 | 0.466 |
| Average Randomness   | 1.0 | 0.846 | 0.968 | 0.907 |
| Average Reliability  | 1.0 | 0.997 | 0.991 | 0.945 |
| Average Steadiness   | 1.0 | 0.984 | 0.985 | 0.938 |
| Average Uniqueness   | 0.5 | 0.072 | 0.472 | 0.465 |
| Average Bit Aliasing | 0.5 | 0.195 | 0.505 | 0.466 |

TABLE III

Impact of Robustness Experiments on PUF metrics

| PUF Metrics | Ideal Value | Benchmark Dataset | Rotated | Crumpled | Scribbled | Soaked | Heat | Mixed Light |
|---|---|---|---|---|---|---|---|---|
| Average Uniformity | 0.5 | 0.466 | 0.466 | 0.463 | 0.454 | 0.460 | 0.460 | 0.466 |
| Average Randomness | 1.0 | 0.907 | 0.906 | 0.896 | 0.873 | 0.877 | 0.890 | 0.907 |
| Average Reliability | 1.0 | 0.945 | 0.877 | 0.852 | 0.856 | 0.750 | 0.882 | 0.905 |
| Average Steadiness | 1.0 | 0.938 | 0.839 | 0.528 | 0.870 | 0.554 | 0.554 | 0.874 |
| Average Uniqueness | 0.5 | 0.465 | 0.465 | 0.470 | 0.468 | 0.463 | 0.461 | 0.465 |
| Average Bit Aliasing | 0.5 | 0.466 | 0.466 | 0.463 | 0.454 | 0.460 | 0.460 | 0.466 |

Robustness Evaluations

In the following, an exemplary implementation is evaluated with respect to robustness in non-ideal circumstances. First, the robustness of the method against misalignment is considered, i.e., in cases where the rectangular box is not aligned to the photo frame. Then, the robustness of the method against paper being roughly handled is considered in the following cases: the paper sheet is crumpled, some scribbling is done in the rectangular box, the sheet is soaked in water and dried afterwards, and the sheet is ironed after soaking and partially burnt. Finally, the effect of using an alternative light source is considered. In the following, the details of each experiment are given and the biometric and PUF metrics in each of the cases is provided.

Impact of Non-Ideal Data Collection

Photo Rotation. The orientation of the photo is the angle between the rectangular box and the photo frame. A rotated photo is shown in FIG. 10(b). In this example, the maximum rotation possible such that the box is still fully captured within the boundary of the photo frame is around 12°. 10 paper sheets have been selected and 5 samples collected in each angle within $\{-12°, -11°, \ldots, 0°, \ldots, +11°, +12°\}$. This gives 125 samples per sheet, 1250 samples in total.

Figure 11:
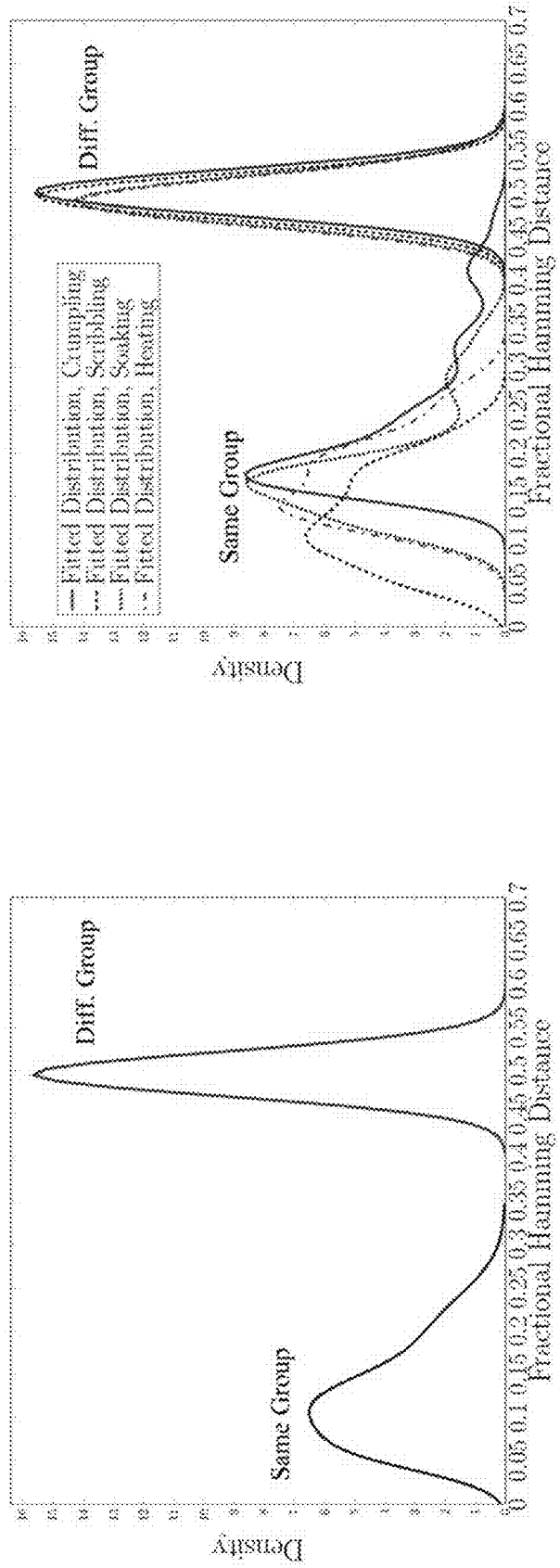
FIG. 11 illustrates Hamming distance distributions for robustness experiments.

FIG. 11 shows the Hamming distance distributions. As expected, the same-group and different-group distributions get slightly closer to each other in comparison with the benchmark dataset. However, decidability, although reduced, is still a healthy $d' \approx 8$. This shows that the image processing method is somewhat sensitive to the image rotation. However, with the current method and based on a threshold of 0.4, the FAR is still 0%, and the FRR is less than 1%. These values can be found in Table I.

The PUF metrics are presented in Table II. The experiment dataset still has good uniformity, randomness, and bit-aliasing, but there is a slight drop in reliability, steadiness, and uniqueness compared to the benchmark dataset.

The experiment shows that a method according to examples of the present disclosure is robust against non-ideal data collection in terms of rotation. In comparison some other techniques require precise alignment of each surface point across all scans.

Impact of Non-Ideal Paper Handling

In the following, an exemplary implementation is evaluated with respect to robustness against rough handling of paper sheet including crumpling, scribbling, soaking, and heating. For each of the experiments in this section, a set of 10 paper sheets are selected. For each paper sheet, 5 samples were taken before and 5 samples after the non-ideal handling of the paper sheet, adding up to a total of 100 samples per experiment. The same-group and different-group distributions under the test conditions of crumpling, scribbling, soaking and heating are shown in FIG. 11. For readability, fitted curves are shown for the distributions. These curves are non-parametric fits with a threshold bandwidth of 0.02 (i.e., the distributions are merely smoothed).

Crumpling. In this experiment, the paper sheets were crumpled to the extent that the borders of the rectangular box were visibly distorted. It was not attempted to smooth out the sheet surface after crumpling. An example of a photo taken from a crumpled paper sheet can be seen in FIG. 10(c).

The resulting Hamming distance distributions are shown in FIG. 11. Decidability is $d' \approx 4.6$. Based on the threshold of 0.4, the FAR is still 0%, and the FRR is 3.2%. These values can be found in Table I.

The PUF metrics are presented in Table III. The experiment dataset still has good uniformity, randomness, and bit-aliasing, but there is a slight drop in reliability and uniqueness and a bigger drop in steadiness compared to the benchmark dataset.

Scribbling. In this experiment, random patterns were drawn with a black pen over all samples such that each pattern covers around 5% of the box area. An example of such scribbling can be seen in FIG. 10(d). The preprocessing phase successfully identifies the scribbled area in the mask in all samples.

The resulting Hamming distance distributions are shown in FIG. 11. The maximum same-group Hamming distance is 0.25 and the minimum different-group Hamming distance is 0.45. The distributions are well-separated. Decidability is $d' \approx 9.7$. Based on the threshold of 0.4, the FAR is still 0%, and the FRR is also 0%. These values can be found in Table I.

The PUF metrics are presented in Table III. The experiment dataset still has good uniformity, randomness, and bit-aliasing, but there is a slight drop in reliability, steadiness, and uniqueness compared to the benchmark dataset.

Soaking. In this experiment, the paper sheets were submerged in tap water for around 20 seconds. Then, they were allowed to dry naturally, and the after-soaking samples were collected from the dried sheets.

The resulting Hamming distance distributions are shown in FIG. 11. The maximum same-group Hamming distance is 0.36 and the minimum different-group Hamming distance is 0.44. The distributions are well-separated. Decidability is $d' \approx 6.8$. Based on the threshold of 0.4, the FAR is still 0%, and the FRR is also 0%. These values can be found in Table I.

The PUF metrics are presented in Table III. The experiment dataset still has good uniformity, randomness, and bit-aliasing, but there is a slight drop in reliability and uniqueness and a bigger drop in steadiness compared to the benchmark dataset.

Heating. In this experiment, all the papers from the soaking experiment were ironed for at least 20 seconds, to the extent that in some cases there was a clearly visible colour change (to light brown) and the paper was partly burnt.

The resulting Hamming distance distributions are shown in FIG. 11. The maximum same-group Hamming distance is 0.30 and the minimum different-group Hamming distance is 0.44. The distributions are well-separated. Decidability is d'≈8.6. Based on the threshold of 0.4, the FAR is still 0%, and the FRR is also 0%. These values can be found in Table I.

The PUF metrics are presented in Table III. The experiment dataset still has good uniformity, randomness, and bit-aliasing, but there is a slight drop in reliability and uniqueness and a bigger drop in steadiness compared to the benchmark dataset.

Summary. Taking all the above results into consideration, it can be seen that the method shows the strongest robustness against scribbling. Both the biometric and PUF measures support this observation. The Hamming distance distributions are well-separated and all PUF metrics remain close to ideal values. Fingerprinting is also fairly robust against rotation, soaking, and heating. There is no or negligible false rejection rates and all PUF metrics possibly except for steadiness remain close to ideal values. Crumpling seems to pose the strongest challenge to robustness. Although false rejection rate is 3.2% and steadiness is not ideal, the method is still able to provide 0% false acceptance rate and healthy PUF metrics otherwise.

Focusing on biometric metrics, authentication rates remain perfect or nearly perfect under all robustness tests. This means the method provides a paper-based document authentication technique which is able to cope with non-ideal sample collection and rough handling.

Focusing on PUF metrics, space and device dimension metrics stay close to ideal values under all tests, which indicates that the quality of fingerprint bits are still good and the sheets remain clearly distinguishable from one another. Time dimension metrics remain close to ideal values for rotation and scribbling, but steadiness and in some cases reliability drops as a result of crumpling, soaking, or heating. This is expected as crumpling, soaking, and heating physically change the paper sheets.

Impact of a Different Light Source

The light source should be bright enough to reveal the texture patterns in a paper sheet. In one exemplary implementation, an overhead projector may be used, although the equipment is relatively bulky and expensive. However examples of the present disclosure are robust against using a different light source. To investigate this robustness, a commodity light box (tracing pad) was used (see FIG. 4(c)). Then, the same paper sheets were used as in the benchmark dataset—excluding 10 paper sheets that were used in other robustness tests—to collect a new set of samples using the new light source. The same data collection procedure as before was followed.

Due to the difference in the light intensity, the camera setting needs to be adjusted. In particular, the exposure time was altered to 1/500 seconds and F-stop altered to f/5. These values were automatically recommended by the camera. The exposure time is the duration that the shutter takes to capture a photo and F-stop is the radius of the lens diaphragm; both of them are inspired by the way human eyes react to a light source. These modifications in the camera setting were necessary because of the change in the intensity of the light source. The final dataset included 900 captured images, 10 samples from each paper sheet.

Figure 12:
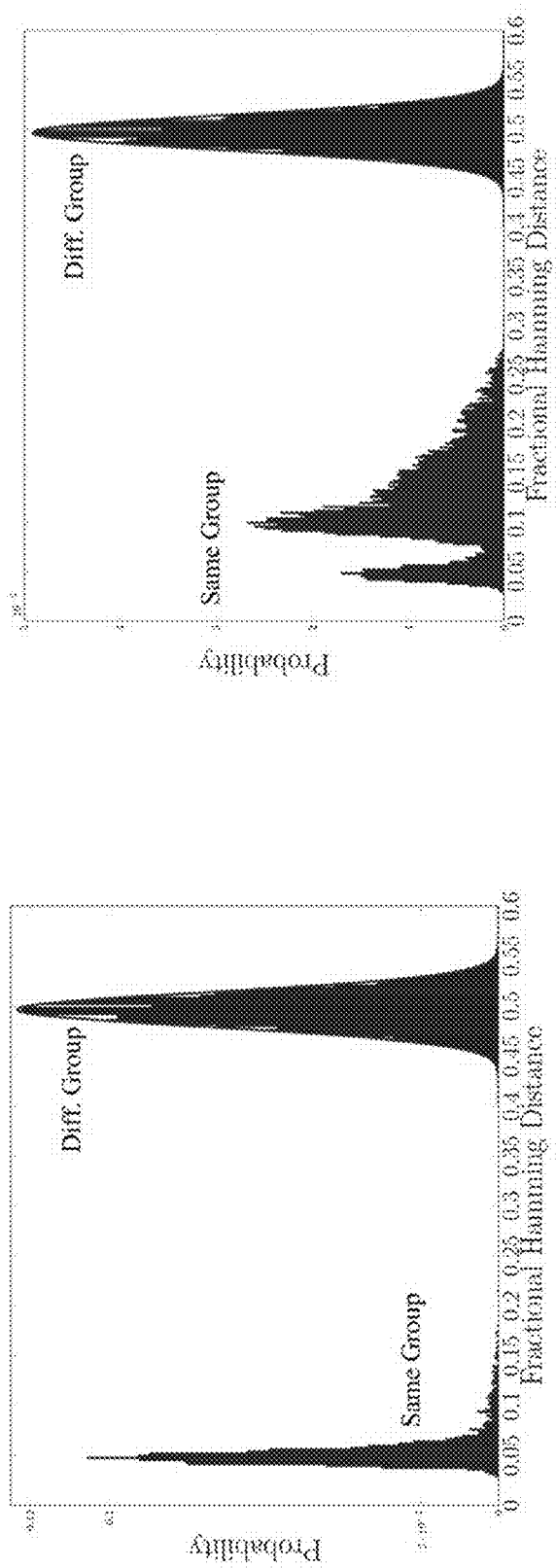
FIG. 12 illustrates distributions of Hamming distances for a light box experiment.

FIG. 12(a) shows the Hamming distance distributions using the light box. The same-group and different-group distributions are well-separated from each other. Applying the biometric metrics, our analysis shows the decidability d'≈24 and the number of the degrees of freedom DoF≈846, both slightly higher than those obtained with the overhead projector. Based on the threshold of 0.4, the FAR and FRR are still 0%. These values can be found in Table I.

The PUF metrics are presented in Table III. These experiment results show that all PUF metrics are comparable to those obtained earlier in the benchmark dataset.

FIG. 12(b) shows the Hamming distance distribution by combining the light box and overhead projector datasets. The number of the degrees of freedom is roughly unchanged at DoF≈836. However, the same-group data become noisier because of mixing two different light sources. The decidability drops to 10. Despite of the mix of different light sources, the same-group and different-group histograms are still clearly separated. The maximum Hamming distance for the same-group samples is 0.31 while the minimum Hamming distance of the different-group is 0.42.

The experiment shows that the method is robust against different light sources, as long as the camera settings are set correctly.

Authentication Protocols

The following provides an explanation of authentication protocols based on the extracted paper fingerprint, and a discussion of their practical performance.

Trust Assumptions

The fingerprinting technique according to the present disclosure may be applied in a range of applications, e.g., to prevent counterfeiting of paper currency, passports, certificates, contracts and official receipts. The secure use of the fingerprint is based on two assumptions. Both assumptions are generally required in biometrics and physical unclonable functions (PUF) applications.

The first assumption is physical "unclonability". For example, it is assumed that it is infeasible to physically clone a paper sheet with the same paper texture. The paper texture is formed from randomly interleaved wooden particles, as a naturally occurring outcome of the paper manufacturing process. This process cannot be precisely controlled. Repeating exactly the same process to produce the same paper texture is considered to be prohibitively expensive, if not impossible (for example, see Ravikanth S. Pappu. 2001. Physical one-way functions. Ph.D. Dissertation. Massachusetts Institute of Technology. http://pubs.media.mit.edu/pubs/papers/01.03.pappuphd.powf.pdf the entire contents of which are incorporated herein by reference).

The second assumption is about a trustworthy measuring process. Take the human fingerprint authentication as an example. If an attacker is able to deceive the scanner by presenting a gummy finger, the security guarantee based on the "unclonability" assumption will be lost. In any biometric or PUF application, it is important to ensure that the measurement is performed on a real object and a fresh measurement is acquired. In practice, this is often realized through the human supervision in the process or by using specialized equipment (e.g., iris scanners with embedded liveness test). In the case of paper documents, visual inspection can be applied to check that they are made of paper and the paper fiber texture has not been tampered with. An attacker may try to interfere with the texture measurement by printing patterns on the paper surface. Using today's commodity printers, it seems unlikely that an attacker is able to print patterns that are precise at the pixel level under the microscopic view of a high-resolution camera (since the print head cannot be precisely controlled and each printed dot tends to be in a scattered pattern due to imperfection of the printing process; see William Clarkson, Tim Weyrich, Adam Finkelstein, Nadia Heninger, J Alex Halderman, and Edward W Felten. 2009. Fingerprinting blank paper using commodity scanners. In Security and Privacy, 2009 30th IEEE Symposium on. IEEE, 301-314, the entire contents of which are incorporated herein by reference). However, when the measurement is not guaranteed to be coming from real paper texture, the acquisition process is no longer trustworthy—an attacker can at least deny the authentication by printing random patterns with strong contrast on the paper. This threat can be addressed by checking that the intended area for authentication is free from overprinting.

Comparison Based on Hamming Distance

A straightforward application of authenticating a paper fingerprint is based on comparing the Hamming distance between two fingerprints. It consists of two phases. In the first phase, a paper fingerprint, along with a mask, is extracted from the textural patterns as the template and stored in a database. In the second phase, given a provided paper sheet, the same fingerprinting algorithm is followed to output a new fingerprint and a mask. Depending on the applications, there are two types of authentication modes: verification or recognition.

Verification works on a one-to-one comparison. This assumes the reference to the stored template is known (as it is often provided by the authenticating subject). Hence, once the template is retrieved, it is a straightforward comparison between two fingerprints based on their Hamming distance as explained in Equation 5. This comparison determines if the presented paper sheet is the same as the one registered earlier.

By contrast, recognition works on a one-to-many comparison. In this case, the reference to the pre-stored template is unknown. Hence, the program searches throughout the database, comparing the extracted fingerprint exhaustively with each of the stored templates in order identify a match where the Hamming distance is sufficiently small.

In terms of accuracy, the recognition mode is generally more demanding than the verification mode, because the false accept rate accumulates with the size of the database. As an illustration, let $P_1$ be the false acceptance rate for one-to-one matching in the verification mode. Assume $P_1$ is very small. Let $P_n$ be the false acceptance rate in the recognition mode for a database of n records.

$$P_n = 1-(1-P_1)^n \approx n \cdot P_1$$

The above equation shows that the accumulative false acceptance rate in the one-to-many mode increases roughly linearly with the size of the database (see the Daugman 2003 reference above). Hence, for the one-to-many matching to work accurately, the false acceptance rate for the one-to-one comparison must be extremely small.

For the paper fingerprints extracted in examples of the present disclosure, they have sufficient entropy to support precise recognition even for an extremely large database. Based on the binomial distributions with 807 degrees of freedom, the false acceptance rates for comparing two paper fingerprints are listed in Table IV. If we opt to maintain $P_n < 10^{-6}$ for the recognition mode as stated in the Daugman 2003 reference above, an algorithm according to the present disclosure can easily support searching a database of 3 quintillions ($3 \times 10^{18}$) fingerprints at a threshold of 0.32. By comparison, for the same accuracy ($<10^{-6}$) and the same threshold (0.32), iris recognition can only support a database of only 26 iris codes. As stated in the Daugman 2003 reference above, for a database of a million iris codes, the threshold needs to be adjusted downwards to below 0.27 to keep the false accept rate under $10^{-6}$. Because of the much higher degrees of freedom of paper fingerprints, they can be used for the recognition application at a much larger scale than the iris biometric.

TABLE IV

False Acceptance Rate (FAR) for comparing two fingerprints

| HD Threshold | False acceptance rate |
|---|---|
| 0.30 | $7.1 \times 10^{-31}$ |
| 0.31 | $5.3 \times 10^{-28}$ |
| 0.32 | $2.7 \times 10^{-25}$ |
| 0.33 | $1.0 \times 10^{-22}$ |
| 0.34 | $2.5 \times 10^{-20}$ |
| 0.35 | $4.5 \times 10^{-18}$ |
| 0.36 | $5.8 \times 10^{-16}$ |
| 0.37 | $5.2 \times 10^{-14}$ |
| 0.38 | $3.3 \times 10^{-12}$ |
| 0.39 | $1.5 \times 10^{-10}$ |
| 0.40 | $5.2 \times 10^{-9}$ |

Paper Fingerprint Encryption

One limitation with the previous verification/recognition method is that the template is stored in plaintext in the database. When the plaintext template is revealed, it may cause degradation of security. This is especially the case with biometrics, since biometric data is considered private to each individual. Paper fingerprints are essentially "biometrics" of paper. One technique in biometrics is through biometric encryption. A similar technique can be applied to realize fingerprint encryption. In the following, an exemplary implementation is described, and it is shown that because paper fingerprints have much higher entropy than even the most accurate biometric in use (iris), the corresponding encryption scheme is able to provide much higher security assurance as well.

Figure 13:
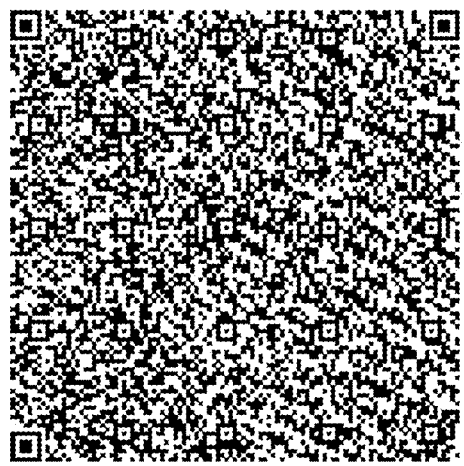
FIG. 13 illustrates a generated QR Code in an authentication protocol, where the QR code contains the encrypted fingerprint, H(k) and a digital signature for both items.

This exemplary implementation comprises two phases. In phase one, the program extracts a paper fingerprint from the paper texture as a reference $f_a$. It then generates a random key k (e.g. 140 bits), and expands the key to a pseudo fingerprint $f_p$=ErrorCC(k) (e.g. a 2048-bit codeword) where ErrorCC is an error-correction encoding scheme, for example based on Hadamard-Reed-Solomon. There may be a combination of block and random errors in fingerprints obtained in examples of the present disclosure; therefore, a concatenated approach may be selected. The choice of 140 bits k is a balance between security (e.g. minimum 128 bit security for the secret key) and performance, as well as considering the special parametric requirements for a concatenated code scheme to work at a desired level of error correction. Subsequently, the scheme computes an encrypted fingerprint $r=f_a \oplus f_p$. In addition, the program computes h=H(k) where H is a secure one-way hash function. Finally, the program stores r and h in the database. Alternatively, r and h can be stored in a 2-D barcode printed on paper. The advantage of doing so is to allow authentication in the off-line mode. In this case, an additional digital signature s should be included to prove the authenticity of data in the barcode. At this stage, the original template $f_a$ and the random key k can be safely deleted. The registration process is summarized in Algorithm 1. FIG. 13 shows a QR code generated from the registration phase in an example of the present disclosure.

The second phase is authentication. In this phase, data from the 2-D barcode is first read and the digital signature verified. A paper fingerprint $f_s$ is extracted from the provided paper sheet. The program then computes:

$$f_s \oplus r = f_s \oplus (f_a \oplus ErrorCC(k))$$
$$= (f_e \oplus f_a) \oplus ErrorCC(k)$$
$$= e \oplus ErrorCC(k)$$

In the above equation, e can be regarded as "noise" added to the codeword ErrorCC(k). As explained above, the Hamming distances between same-paper fingerprints typically range from 0 to 0.25. In the definition of the Hadamard-Reed-Solomon code, in this example the coding parameters are the same as described in Feng Hao, Ross Anderson, and John Daugman. 2006. Combining crypto with biometrics effectively. Computers, IEEE Transactions on 55, 9 (2006), 1081-1088, the entire contents of which are incorporated herein by reference. The resultant error correction code is capable of correcting up to 27% error bits in a 2048-bit codeword. Hence, by running the Hadamard-Reed-Solomon decoding scheme, the error vector e can be effectively removed, and the original k can be recovered error-free. The correctness of the decoding process can be verified by comparing the obtained k against the retrieved H(k). This authentication process is summarized in Algorithm 2.

---
ALGORITHM 1: Registration
---
Generate Random key k ;
Generate Reference Paper Fingerprint $f_a$;
Expand key k to Pseudo Fingerprint $f_p$ ;
Calculate r = $f_a \oplus f_p$;
Calculate h = H(k);
Calculate Digital Signature s = Sig(r,h);
Store (r,h,s) in a 2-D barcode ;

---
ALGORITHM 2: Verification
---
Read r, h = H(k) and s = Sig(r, h) ;
if Signature Verification Success then
   | Generate Paper Fingerprint $f_s$ ;
   | Calculate f' = $f_s \oplus$ r ;
   | Acquire k' by decoding f' ;
   | Calculate H(k') ;
   | if H(k')==H/(k) then
   |  | Success ;
   | else
   |  | Failure ;
else
   | Failure ;

A key feature of the above "fingerprint encryption" scheme is that it preserves the secrecy of the fingerprint template since it forms the basis for authentication. In this way, no fingerprint template is stored in the plain form. As an example for comparison, without using this encryption scheme, the barcode would contain the plain fingerprint template. Once in the line of sight to an attacker, the barcode can be trivially read say by using a video camera, hence the template will be stolen. With the encryption scheme applied, the attacker would need physical access to the paper in order to take a close-up snapshot of the fiber textures with a bright light source shining underneath the paper. This makes the attack significantly more difficult to carry out in practice without the user noticing it.

Hence, the application of privacy preserving protocol for authentication avoids storing the texture structure in the plain text form. The goal here is to protect the paper texture from an attacker who does not have physical access to the paper sheet itself. An adversary who has access to the barcode printed on the paper can read all data including an encrypted fingerprint r=$f_a \oplus$ErrorCC(k). One potential problem is that if the fingerprint $f_a$ contains significant correlations between bits, r may leak information about the fingerprint. The iris code may be given as an example to illustrate that due to a high level of redundancy in iris codes, the encrypted iris code only has a lower-bound security of 44 bits. However, 44 bits security is not sufficient to satisfy high security requirements. As a result, the encrypted iris code (also called the secure sketch in the PUF literature) should not be published as public data; instead, it should be stored in a personal token.

The above limitation with the iris codes does not apply in examples of the present disclosure. Although the paper fingerprint in an exemplary implementation may have the same size as an iris code (e.g. 2048 bits), it has much higher degrees of freedom (e.g. 807 as compared to 249). Following the same sphere-packing bound as defined in the Hao 2006 reference above, the lower-bound security for the encrypted fingerprints may be estimated as follows. Here, the lower-bound security refers to the minimum efforts required for a successful brute-force attack, under the assumption that the attacker has perfect knowledge of the correlations within the document paper sheet's fingerprint, hence the uncertainty (or entropy) about the fingerprint is 807 bits instead 2048 bits. The error correction capability for the Hadamard-Reed-Solomon code allows correcting up to 27% error bits. So in principle the attacker only needs to guess a fingerprint that is within the Hamming distance of 807×0.27≈218 bits to the correct fingerprint. Following the estimation method in the Hao 2006 reference above, based on the sphere-packing bound (see Richard W Hamming. 1950. Error detecting and error correcting codes. Bell System technical journal 29, 2 (1950), 147-160, the contents of which are incorporated herein by reference), the minimum guess effort with z=807 and w=218 is calculated with the following equation:

$$G \geq \frac{2^z}{\sum_{i=0}^{w}\binom{z}{i}} = 2^{133} \quad (14)$$

The above bound states that an attacker with full knowledge about fingerprint correlations and the error correction process would need at least $2^{133}$ attempts in order to uncover the original fingerprint used in the registration and the random key k. This 133-bit security is much higher than the 44-bit security reported in the Hao 2006 reference above, and is sufficient for almost all practical applications. This is possible because the paper textural patterns are far more distinctive than iris textural patterns. In iris, there exist substantial correlations along the radial structures. The same phenomenon does not exist in paper texture, which explains the higher degrees of freedom in examples of the present disclosure. This high level of security makes it possible to simply store the (r, h, s) values on a barcode instead of in a secure database. Alternatively, they may be stored in an RFID chip, and retrieved wirelessly during the verification phrase (e.g., in an e-passport application).

The performance of this authentication scheme may be evaluated based on the benchmark database and the scheme is able to achieve perfect error rates: 0% FRR and 0% FAR.

Figure 14:
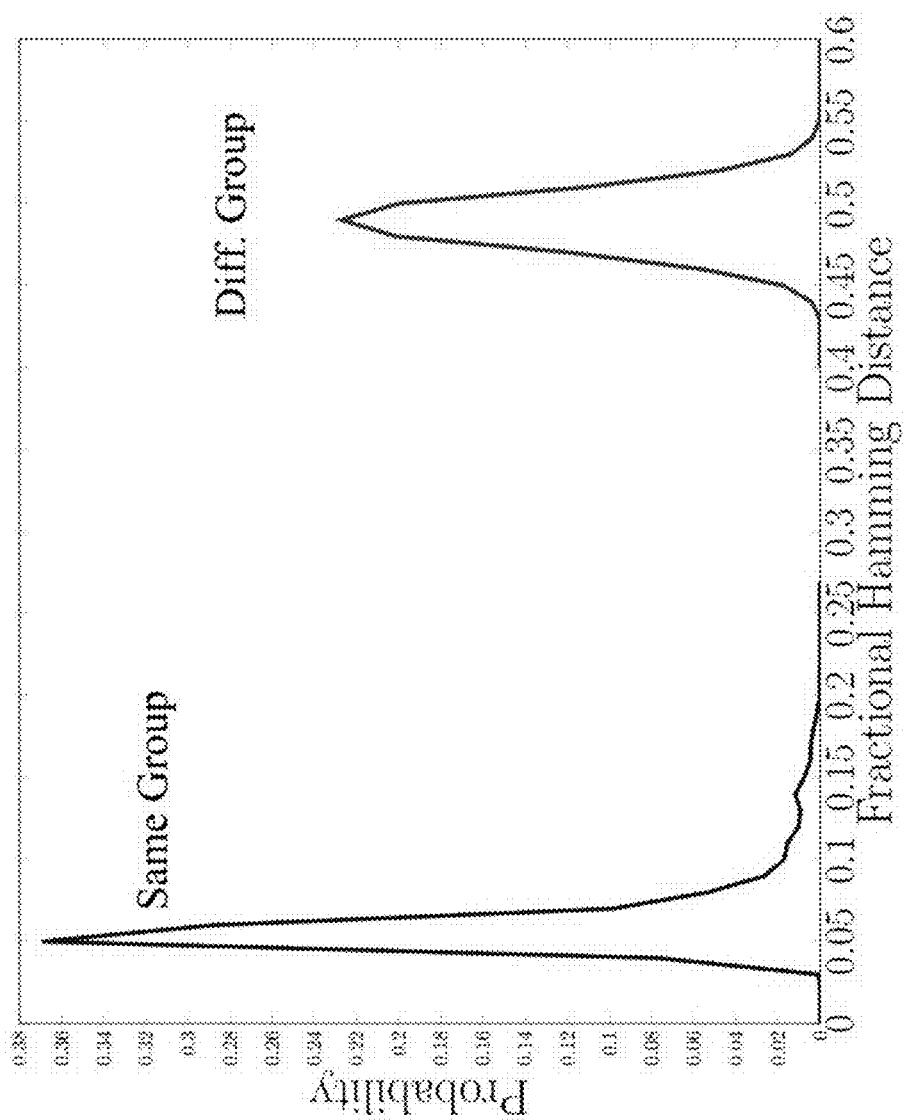
FIG. 14 illustrates histogram of Hamming distances between raw fingerprints without masks.

Note that this performance evaluation is slightly different from the direct comparison between two fingerprints based on their Hamming distance. The authentication is successful, only if the Hadamard-Reed-Solomon code is able to correct the errors (introduced by the XOR between two fingerprints) added to the error correction codeword, and hence recover the same random k (verified again H(k)). The authentication protocol may accommodate raw fingerprints, without masks. FIG. 14 shows the histogram of Hamming distance between raw fingerprints without masks. The same-paper and different-paper distributions are well-separated. The error correct code implemented corrects errors up to 27%. This is sufficient to correct errors for all same-paper fingerprints, yet not sufficient for different-paper fingerprints. This explains the 0% FRR and 0% FAR that are obtained (see FIG. 14).

Certain prior art paper-fingerprinting techniques have different requirements on paper material, use different types of illuminating sources and scanning equipment, apply different signal processing techniques and obtain fingerprints of different types and features. Examples of the present disclosure provide a practical solution that works with ordinary paper, may use an ordinary lighting source combined with an off-the-shelf camera, takes a relatively short time (e.g. only 1.3 seconds) to produce a compact fingerprint (e.g. 256 bytes) from one snapshot, may achieve an ideal 0% FFR, 0% FAR as well as very high entropy (807 bits) in fingerprints, and is demonstrably robust against rotation, crumpling, scribbling, soaking and heating. The near perfect result is attributed to the idea of capturing the paper textural patterns through transmissive light. As detailed above, using transmissive light reveals richer textural patterns than reflective light and produces more reliable features. This explains the superior results of examples of the present disclosure as compared to previous surface-based paper fingerprinting methods.

Examples of the present disclosure fingerprint a paper sheet based on its texture patterns instead of features on the surface. The former contain more distinctive features than the latter with higher decidability in the histogram of Hamming distance distributions. Experiments may be set up to use a commodity camera to photograph the texture patterns with a light source shining on the other side of the paper. The rich texture patterns may be processed using Gabor wavelets to generate a compact, for example 2048-bit, fingerprint code. Based on the collected database, zero error rates may be achieved. The method works well with different light sources, and is resistant against various distortions such as crumpling, scribbling, soaking and heating. The extracted fingerprints may contain 807 degrees-of-freedom, for example, which is sufficiently high for many practical applications. As an example, some applications (like e-passport) rely on a tamper-resistant RFID chip embedded in the paper document for proving the authenticity of the document (through a challenge-response protocol based on a long-term secret stored in the chip). A method according to the present disclosure provides an alternative solution that leverages the natural physical properties of the paper document instead of the tamper resistance of an extra embedded chip.

Examples of the present disclosure may be applied to office paper sheets. In addition, examples of the present disclosure may be applied to other types of paper, such as thermal paper, labels and passport pages as long as the light can transmit through. Based on the thickness of the paper and the difference in the texture materials, some changes in the intensity of the light, camera settings, Gabor filter scale and orientation may be required.

Figure 15:
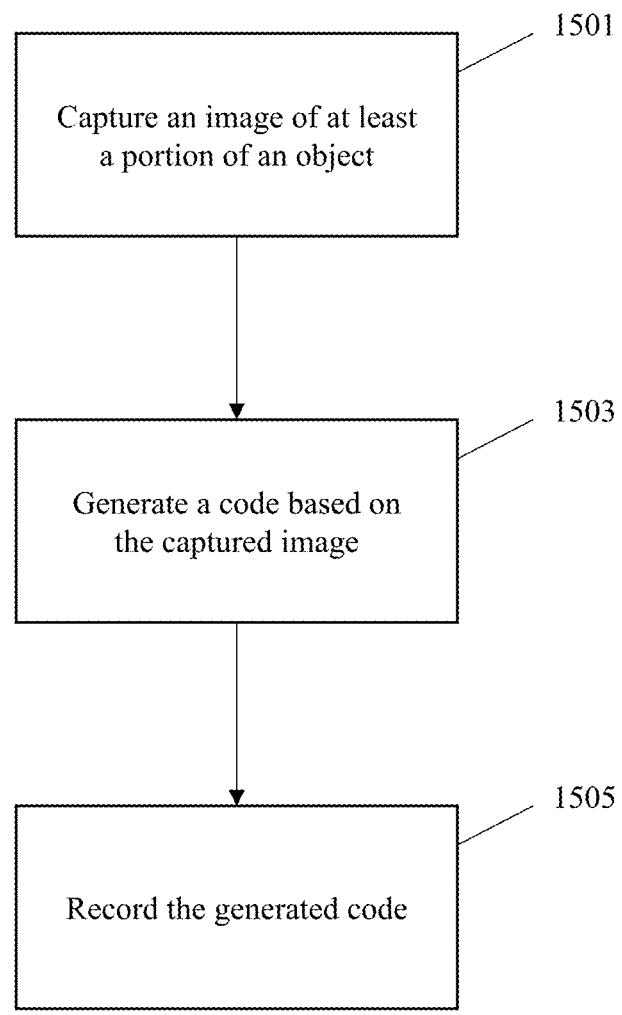
FIGS. 15 and 16 are respectively a flow chart of a method, and a block diagram of an apparatus, for preventing counterfeiting of an object according to examples of the present disclosure.
Figure 16:
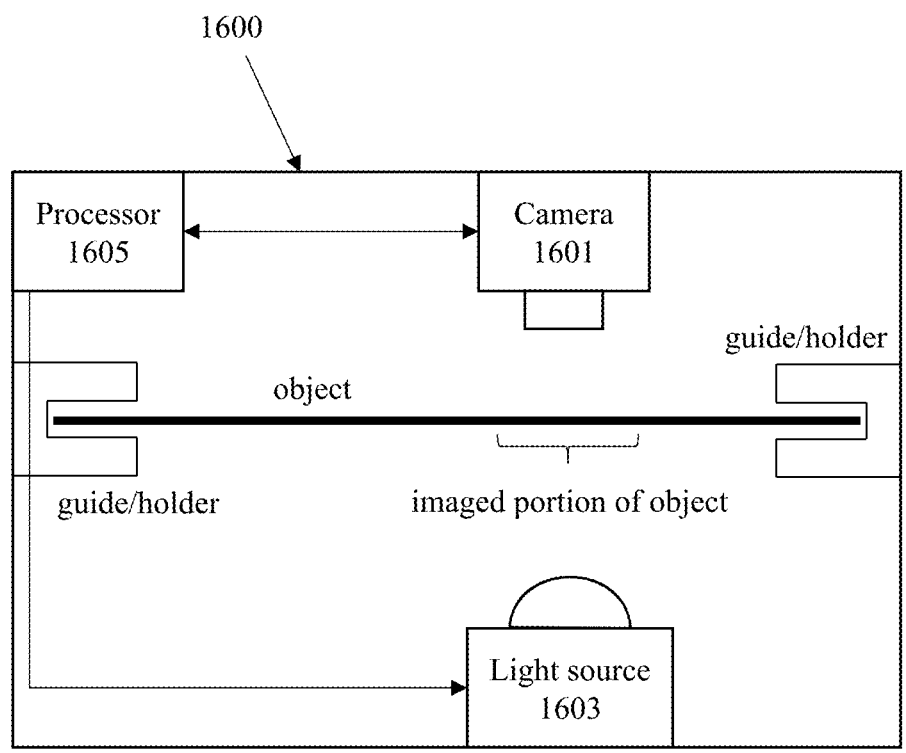

FIGS. 15 and 16 are respectively a flow chart of a method, and a block diagram of an apparatus, for preventing counterfeiting of an object according to examples of the present disclosure (e.g. "registration").

Referring to FIG. 15, in a first step 1501, an image of at least a portion of the object is captured. The portion of the object whose image is captured is at least partially transparent, and the captured image includes features of the internal structure of the object. In certain examples, the object comprises a piece of paper, and the internal structure of the object comprises the texture of the paper resulting from the arrangement of fibres from which the paper is made. The image may be captured, for example, by illuminating one side of the object using any suitable type of light source, and capturing the image from the other side of the object using any suitable type of camera.

In certain examples, a designated area of the captured image may be identified, and the captured image may be corrected for any rotational and/or linear misalignment, for example in a manner described above. In certain examples, the designated area may be indicated by a boundary, and a marker may be provided at a predetermined position relative to the designated area for indicating a correct orientation of the designated area. In certain examples, one or more artefacts in the captured image may be identified, and a mask for the image for masking the artefacts may generated, for example in the manner described above.

In a next step 1503, a code is generated, based on the image, such that the code encodes features of the internal structure of the object. In certain examples, the code may be generated by applying a filter to the image to obtain a filtered image, and processing the filtered image to obtain a binary code. For example, the filter may be a Gabor filter or any other suitable type of filter or function, and when a Gabor filter is used the filtered image C(x, y) may be computed in the manner described above. In certain examples, the filtered image may be processed by applying a Gray code to the filtered image in the manner described above, or by applying any other suitable encoding scheme. In certain examples, the binary code may be encrypted, for example in the manner described above or in any other suitable manner. For example, a random key, k, may be generated, and then a codeword $f_p$ may be obtained by applying any suitable type of error-correction encoding scheme (e.g. the Hadamard-Reed-Solomon code scheme), ErrorCC, to the random key according to $f_p$=ErrorCC(k). An encrypted binary code, r, may then be computed according to $r=f_a \oplus f_p$, and a hash value, h, may be computed according to h=H(k).

In a next step 1505, the code is recorded (i.e. so that it can be retrieved later for the purpose of authentication). For example, the code may be printed on the object (e.g. as a sequence of digits, or in the form of a barcode or QR code and the like), or stored in a database, on a recording medium that is readable via short-range wireless communication (e.g. an RFID tag and the like), or on an electronically readable recording medium (e.g. a disc, memory chip and the like). In certain examples, various values may be recorded. For example, the values r and h may be recorded. In certain examples, a digital signature, s, may be computed based on r and h, and the digital signature may also be recorded.

The method of FIG. 15 may be implemented in any suitable manner using any suitable combination of hardware and/or software. One such example is an apparatus for preventing counterfeiting of an object as illustrated in FIG. 16. As illustrated, the apparatus 1600 comprises a camera 1601 for capturing an image of at least a portion of the object, a light source 1603 for illuminating the portion of the object whose image is captured, and a processor (or controller) 1605 for performing the various operations and control required for implementing the techniques described above, including generating, based on the image, a code that encodes features of the internal structure of the object, and outputting the code. In certain examples, the apparatus 1600 may further comprise a guide and/or holder for assisting the user in guiding the object to the correct position and/or holding the object in the correct position for image capture.

Figure 18:
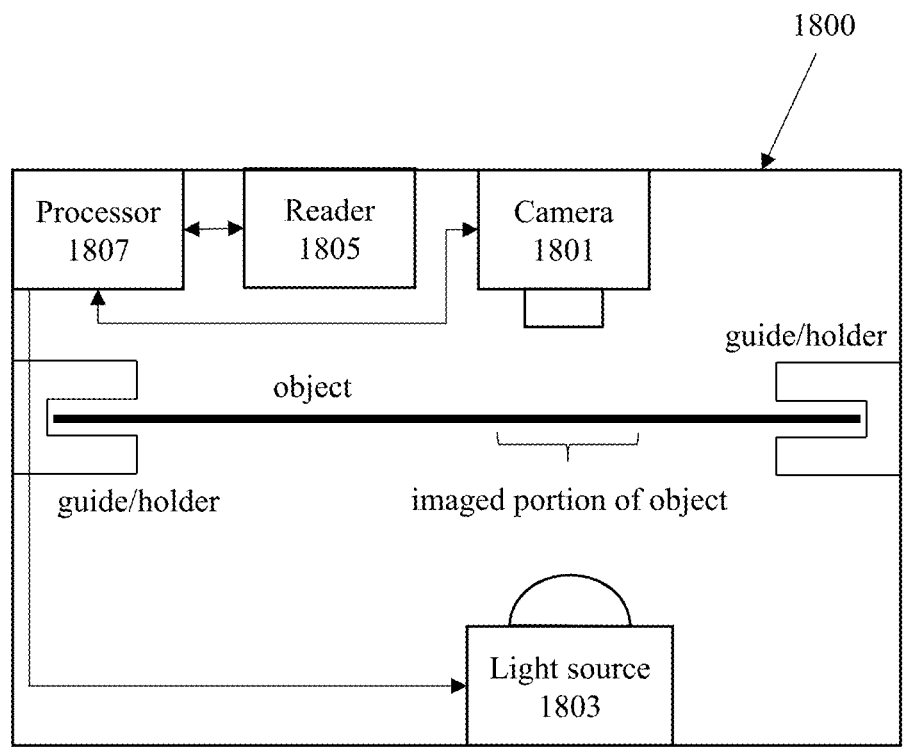
FIGS. 17 and 18 are respectively a flow chart of a method, and a block diagram of an apparatus, for authenticating an object according to examples of the present disclosure.
Figure 17:
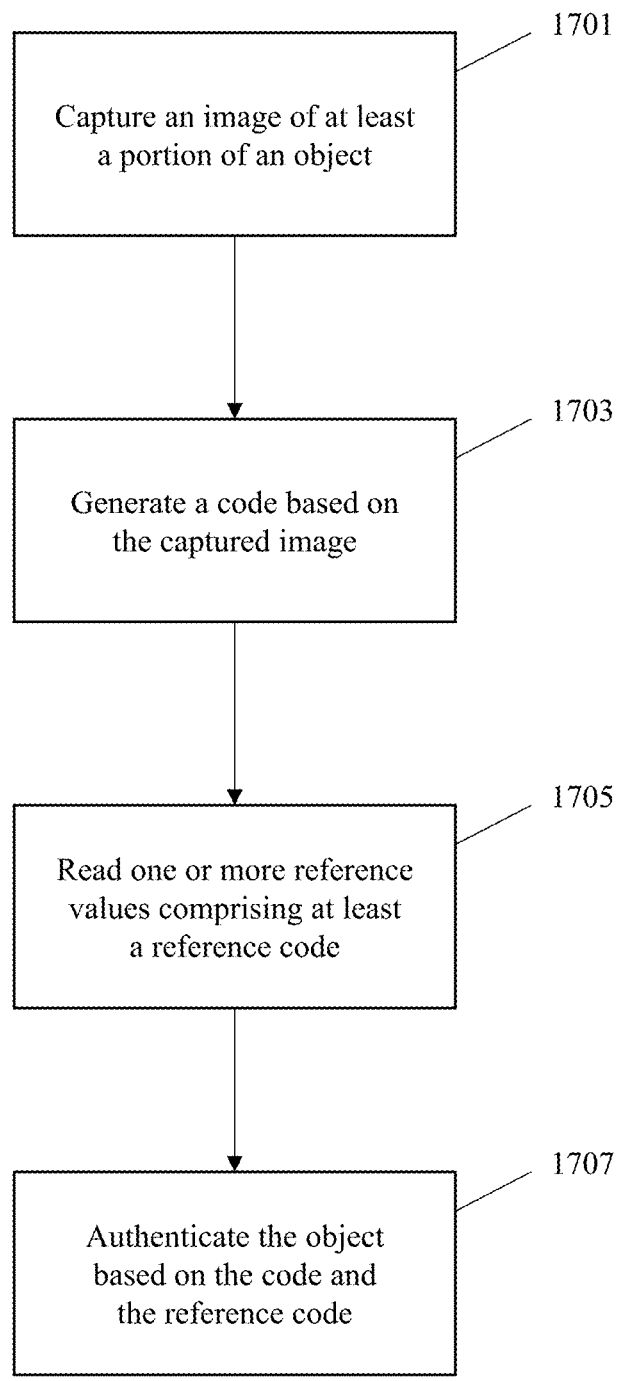

FIGS. 17 and 18 are respectively a flow chart of a method, and a block diagram of an apparatus, for authenticating an object according to examples of the present disclosure. (e.g. "verification").

Referring to FIG. 17, in a first step 1701 an image of at least a portion of the object is captured. Step 1701 of FIG. 17 may be performed in substantially the same manner as step 1501 of FIG. 15. In particular, the portion of the object whose image is captured is at least partially transparent, and the captured image includes features of the internal structure of the object. The portion of the object whose image is captured in step 1701 of FIG. 17 should correspond to the portion of the object whose image is captured in step 1501 of FIG. 15.

As above, in certain examples, the object comprises a piece of paper, and the internal structure of the object comprises the texture of the paper resulting from the arrangement of fibres from which the paper is made. The image may be captured, for example, by illuminating one side of the object using any suitable type of light source, and capturing the image from the other side of the object using any suitable type of camera.

As above, in certain examples, a designated area of the captured image may be identified, and the captured image may be corrected for any rotational and/or linear misalignment, for example in a manner described above. In certain examples, the designated area may be indicated by a boundary, and a marker may be provided at a predetermined position relative to the designated area for indicating a correct orientation of the designated area. In certain examples, one or more artefacts in the captured image may be identified, and a mask for the image for masking the artefacts may generated, for example in the manner described above. Alternatively or additionally, a predetermined mask (e.g. a mask determined during the method of FIG. 15) may be applied.

In a next step 1703, a code is generated, based on the image, such that the code encodes features of the internal structure of the object. Step 1703 of FIG. 17 may be performed in a similar manner as step 1503 of FIG. 15. For example, the code may be generated by applying a filter (e.g. a Gabor filter in a manner described above, or any other suitable type of filter or function) to the image to obtain a filtered image, and processing the filtered image (e.g. by applying a Gray code to the filtered image in the manner described above, or by applying any other suitable type of encoding scheme) to obtain a binary code.

In a next step 1705, one or more reference values, comprising at least a reference code, may be read. For example, the code may be read (e.g. optically) from a printed image (e.g. a sequence of digits, a barcode or QR code and the like) on the object, or retrieved from a database, from a recording medium that is readable via short-range wireless communication (e.g. an RFID tag and the like), or from an electronically readable recording medium (e.g. a disc, memory chip and the like).

In a next step 1707, the object may be authenticated based on the code, $f_s$, and the reference code (e.g. corresponding to the encrypted binary code, r, recorded in step 1505 of FIG. 15). In certain examples, the reference values further comprise a reference hash value (corresponding to the hash value, h, recorded in step 1505 of FIG. 15). In this case, the object may be authenticated by first computing a codeword $f_p'$ according to $f_p' = f_s \oplus r$, then applying an error correction code scheme (e.g. the Hadamard-Reed-Solomon code scheme) to the codeword $f_p'$ to obtain a value k', and the object may be authenticated based on a comparison between a hash value H(k') computed from the value k' and the reference hash value h. The hash function, H, applied here to k' may be the same as the hash function that was used to compute h.

In certain examples, a digital signature, s, of the one or more reference values (corresponding to the signature, s, recorded in the method of FIG. 15) may also be read, and the one or more reference values may be verified based on the digital signature. In certain examples, steps 1701-1707 of FIG. 17 may be carried out only if the verification of the one or more reference values is successful.

The method of FIG. 17 may be implemented in any suitable manner using any suitable combination of hardware and/or software. One such example is an apparatus for authenticating an object as illustrated in FIG. 18. As illustrated, the apparatus 1800 comprises a camera 1801 for capturing an image of at least a portion of the object, a light source 1803 for illuminating the portion of the object whose image is captured, a reader 1805 for reading one or more reference values comprising at least a reference code, and a processor (or controller) 1807 for performing the various operations and control required for implementing the techniques described above, including generating, based on the image, a code that encodes features of the internal structure of the object, and authenticating the object based on the code and the reference code. Similar to the apparatus of FIG. 16, in certain examples, the apparatus 1800 of FIG. 18 may further comprise a guide and/or holder for assisting the user in guiding the object to the correct position and/or holding the object in the correct position for image capture.

Although the use of a hash function has been described above, the skilled person will appreciate that any suitable one-way function may be used.

The invention claimed is:

1. A method for preventing counterfeiting of an object, the method comprising:
    capturing an image of at least a portion of the object, wherein the portion of the object whose image is captured is at least partially transparent, and wherein the captured image includes features of the internal structure of the object;
    generating, based on the image, a code that encodes features of the internal structure of the object; and
    recording the code,
    wherein generating the code comprises applying a Gabor filter to the image to obtain a filtered image, and processing the filtered image to obtain a binary code;
    wherein the filtered image C(x, y) is given by:

$$C(x,y)=I(x,y)*G(x,y)=\iint I(x,y)G(x-\eta, y-\xi)d\eta d\xi$$

where I(x, y) represent the image in grey-scale using Cartesian coordinates, C(x, y) is a complex number for each x and y, * denotes convolution, and G(x, y) is the Gabor filter defined by:

$$G(x, y) = \frac{f^2}{\pi\eta\gamma} \cdot \exp\left(\frac{\eta^2 x'^2 + \gamma^2 y'^2}{2\sigma^2}\right) \cdot \exp(2\pi i f x')$$

for $x' = x\cos(\theta) + y\sin(\theta)$ and $y' = -x\sin(\theta) + y\cos(\theta)$ where f is the frequency of the sinusoidal wave, $\eta$ and $\gamma$ are constant factors that together determine the spatial ellipticity of the Gabor wavelet, $\theta$ represents the orientation of the ellipticity, and $\sigma$ is the standard deviation of the Gaussian envelope.

2. The method according to claim 1, wherein processing the filtered image comprises applying a Gray code to the filtered image.

3. The method according to claim 2, wherein the Gray code is a two-bit Gray code for converting a complex number a+bi into two bits based on which quarter of the complex plane the complex number falls in, and wherein applying the Gray code comprises converting each element of the matrix C(x, y) into two bits according to the Gray code, wherein C(x, y) represents the filtered image.

4. The method according to claim 1, further comprising encrypting the binary code, wherein recording the code comprises recording the encrypted binary code.

5. The method according to claim 1, further comprising:
identifying a designated area of the captured image from which the code is generated; and
correcting the captured image for any rotational and/or linear misalignment.

6. The method according to claim 5, wherein the designated area is indicated by a boundary, and wherein a marker is provided at a predetermined position relative to the designated area for indicating a correct orientation of the designated area.

7. The method according to claim 1, further comprising:
identifying one or more artefacts in the captured image; and
generating a mask for the image for masking the artefacts.

8. The method according to claim 1, wherein capturing the image comprises:
illuminating one side of the object; and
capturing the image from the other side of the object.

9. The method according to claim 1, wherein recording the code comprises one or more of:
printing the code on the object;
printing the code on the object in the form of a barcode or QR code;
storing the code in a database;
storing the code on a recording medium that is readable via short-range wireless communication; and
storing the code on an electronically readable recording medium.

10. The method according to claim 1, wherein the object comprises paper, and wherein the internal structure of the object comprises the texture of the paper resulting from the arrangement of fibres from which the paper is made.

11. The method according to claim 1, further comprising:
generating a random key, k;
obtaining a codeword $f_p$ by applying an error-correction encoding scheme, ErrorCC, to the random key according to $f_p$=ErrorCC(k), wherein $f_p$ has the same size as the binary code $f_a$;
computing an encrypted binary code, r, according to $r=f_a \oplus f_p$, where $\oplus$ denotes modulo-2 addition;
computing a hash value, h, according to h=H(k), where H is a one-way hash function, wherein recording the code comprises recording the encrypted binary code r and the hash value h.

12. The method according to claim 11, further comprising computing a digital signature, s, based on r and h, wherein recording the code comprises recording the digital signature, s.

13. An apparatus for preventing counterfeiting of an object, the apparatus comprising:
a camera for capturing an image of at least a portion of the object, wherein the portion of the object whose image is captured is at least partially transparent, and wherein the captured image includes features of the internal structure of the object;
a processor for generating, based on the image, a code that encodes features of the internal structure of the object, and outputting the code;
wherein the processor is operative to generate the code by applying a Gabor filter to the image to obtain a filtered image, and processing the filtered image to obtain a binary code;
wherein the filtered image C(x, y) is given by:

$C(x,y)=I(x,y)*G(x,y)=\iint I(x,y)G(x-\eta,y-\xi)d\eta d\xi$ where I(x, y) represent the image in grey-scale using Cartesian coordinates, C(x, y) is a complex number for each x and y, * denotes convolution, and G(x, y) is the Gabor filter defined by:

$$G(x, y) = \frac{f^2}{\pi\eta\gamma} \cdot \exp\left(\frac{\eta^2 x'^2 + \gamma^2 y'^2}{2\sigma^2}\right) \cdot \exp(2\pi i f x')$$

for $x' = x\cos(\theta) + y\sin(\theta)$ and $y' = -x\sin(\theta) + y\cos(\theta)$ where f is the frequency of the sinusoidal wave, $\eta$ and $\gamma$ are constant factors that together determine the spatial ellipticity of the Gabor wavelet, $\theta$ represents the orientation of the ellipticity, and $\sigma$ is the standard deviation of the Gaussian envelope.

14. The apparatus according to claim 13, further comprising a light source for illuminating the portion of the object whose image is captured.

15. The apparatus of claim 13, wherein the processor is further operative to:
generate a random key, k;
obtain a codeword $f_p$ by applying an error-correction encoding scheme, ErrorCC, to the random key according to $f_p$=ErrorCC(k), wherein $f_p$ has the same size as the binary code $f_a$;
compute an encrypted binary code, r, according to $r=f_a \oplus f_p$, where $\oplus$ denotes modulo-2 addition;
compute a hash value, h, according to h=H(k), where H is a one-way hash function; and
compute a digital signature, s, based on r and h.

16. The apparatus according to claim 15, further comprising a light source for illuminating the portion of the object whose image is captured.

* * * * *